United States Patent
Nixon et al.

(10) Patent No.: US 10,514,668 B2
(45) Date of Patent: Dec. 24, 2019

(54) GRAPHICAL PROCESS VARIABLE TREND MONITORING IN A PROCESS CONTROL SYSTEM USING A NAVIGATION PANE

(71) Applicant: FISHER-ROSEMOUNT SYSTEMS, INC., Round Rock, TX (US)

(72) Inventors: Mark J. Nixon, Round Rock, TX (US); Maia B. Cook, Carlsbad, CA (US); Daniel I. Manes, San Diego, CA (US); Harvey S. Smallman, San Diego, CA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 919 days.

(21) Appl. No.: 14/207,142

(22) Filed: Mar. 12, 2014

(65) Prior Publication Data

US 2014/0277619 A1 Sep. 18, 2014

Related U.S. Application Data

(63) Continuation-in-part of application No. 13/859,714, filed on Apr. 9, 2013, now Pat. No. 9,983,575.
(Continued)

(51) Int. Cl.
*G05B 23/02* (2006.01)
*G05B 15/02* (2006.01)
(Continued)

(52) U.S. Cl.
CPC ......... *G05B 15/02* (2013.01); *G05B 23/0216* (2013.01); *G05B 23/0272* (2013.01);
(Continued)

(58) Field of Classification Search
CPC .... G05B 15/02; G05B 23/00; G05B 23/0267; G05B 23/0272; G05B 23/0216;
(Continued)

(56) References Cited

U.S. PATENT DOCUMENTS 5,167,010 A 11/1992 Elm et al.
5,631,825 A 5/1997 van Weele et al.
(Continued)

FOREIGN PATENT DOCUMENTS

CN 1658106 A 8/2005
CN 1950760 A 4/2007
(Continued)

OTHER PUBLICATIONS

Office Action for U.S. Appl. No. 13/859,714, dated Oct. 14, 2015.
(Continued)

*Primary Examiner* — Rinna Yi
(74) *Attorney, Agent, or Firm* — Marshall, Gerstein & Borun LLP

(57) ABSTRACT

A process control monitoring system for a process control plant uses graphic trend symbols to assist in detecting and monitoring trends of process variables within the process control plant. A graphic display application within the process control monitoring system may implement and display each graphic trend symbol to graphically indicate or encapsulate current trend and value information of a process variable within the process control plant. The graphic display application may display the graphic trend symbol in a spatially realistic location within a graphical representation of the process control plant while maintaining the hierarchical structure or each hierarchical level of the process plant. The graphic display application may also include a navigation pane and a zoom feature that enable a user to quickly drill down through tend data to obtain more information and to support problem identification and diagnosis tasks.

16 Claims, 18 Drawing Sheets

Related U.S. Application Data

(60) Provisional application No. 61/793,282, filed on Mar. 15, 2013.

(51) Int. Cl.
*G06F 11/34* (2006.01)
*G06F 11/30* (2006.01)

(52) U.S. Cl.
CPC *G05B 2219/32351* (2013.01); *G06F 11/3055* (2013.01); *G06F 11/3409* (2013.01)

(58) Field of Classification Search
CPC ...... G05B 2219/00; G05B 2219/31472; G05B 19/048; G05B 19/406; G06F 3/0484; G06F 3/04847; G06F 3/04842; G06F 3/04817; G06F 11/3409; G06F 11/305
See application file for complete search history.

(56) References Cited

U.S. PATENT DOCUMENTS

| | | | |
|---|---|---|---|
| 6,577,323 | B1 | 6/2003 | Jamieson et al. |
| 6,587,108 | B1 | 7/2003 | Guerlain et al. |
| 6,901,560 | B1 | 5/2005 | Guerlain et al. |
| 6,952,808 | B1 | 10/2005 | Jamieson et al. |
| 7,023,440 | B1 | 4/2006 | Havekost et al. |
| 7,647,126 | B2 | 1/2010 | Blevins et al. |
| 7,729,789 | B2 | 6/2010 | Blevins et al. |
| 8,086,955 | B2 | 12/2011 | Zhou et al. |
| 8,103,367 | B2 | 1/2012 | Schleiss et al. |
| 8,717,374 | B2 | 5/2014 | Nixon |
| 8,825,183 | B2 | 9/2014 | Hammack et al. |
| 9,557,735 | B2 | 1/2017 | Firkins et al. |
| 9,916,068 | B1* | 3/2018 | Bell .................. G06F 3/04842 |
| 2002/0055790 | A1 | 5/2002 | Havekost |
| 2003/0028268 | A1 | 2/2003 | Eryurek et al. |
| 2003/0028269 | A1 | 2/2003 | Spriggs et al. |
| 2004/0186927 | A1 | 9/2004 | Eryurek et al. |
| 2005/0188376 | A1 | 8/2005 | Matsumoto et al. |
| 2007/0132779 | A1* | 6/2007 | Gilbert .............. G05B 19/0426 345/619 |
| 2007/0135944 | A1 | 6/2007 | Schmid et al. |
| 2007/0239291 | A1 | 10/2007 | Wayland et al. |
| 2007/0240071 | A1* | 10/2007 | Sherrill ............. G05B 23/0267 715/764 |
| 2007/0260499 | A1 | 11/2007 | Greef et al. |
| 2008/0027683 | A1 | 1/2008 | Middleton et al. |
| 2008/0125877 | A1 | 5/2008 | Miller et al. |
| 2008/0172629 | A1 | 7/2008 | Tien et al. |
| 2008/0183445 | A1 | 7/2008 | Bissantz |
| 2008/0189638 | A1 | 8/2008 | Mody et al. |
| 2009/0019385 | A1 | 1/2009 | Khatib et al. |
| 2009/0054743 | A1 | 2/2009 | Stewart |
| 2009/0149981 | A1 | 6/2009 | Evans et al. |
| 2009/0164933 | A1 | 6/2009 | Pederson et al. |
| 2009/0319891 | A1 | 12/2009 | MacKinlay et al. |
| 2010/0017743 | A1 | 1/2010 | Swanston |
| 2010/0138763 | A1 | 6/2010 | Kim |
| 2010/0156654 | A1 | 6/2010 | Bullemer et al. |
| 2010/0318934 | A1 | 12/2010 | Blevins et al. |
| 2011/0029102 | A1 | 2/2011 | Campney et al. |
| 2011/0144777 | A1 | 6/2011 | Firkins et al. |
| 2011/0258568 | A1 | 10/2011 | Pandurangan et al. |
| 2011/0292083 | A1 | 12/2011 | Nihlwing |
| 2012/0029661 | A1 | 2/2012 | Jones et al. |
| 2012/0259436 | A1 | 10/2012 | Resurreccion et al. |
| 2013/0100136 | A1 | 4/2013 | Van Camp et al. |
| 2013/0135113 | A1* | 5/2013 | Kagoura ............ G08B 5/22 340/687 |
| 2013/0147630 | A1 | 6/2013 | Nakaya et al. |
| 2014/0039833 | A1 | 2/2014 | Sharpe, Jr. et al. |
| 2014/0096057 | A1* | 4/2014 | Marston ............. B67D 7/06 715/771 |
| 2014/0194089 | A1 | 7/2014 | Park et al. |
| 2014/0277620 | A1 | 9/2014 | Nixon et al. |
| 2014/0282195 | A1 | 9/2014 | Nixon et al. |
| 2014/0303754 | A1 | 10/2014 | Nixon et al. |

FOREIGN PATENT DOCUMENTS

| | | |
|---|---|---|
| CN | 1950762 A | 4/2007 |
| CN | 1950763 A | 4/2007 |
| CN | 1950765 A | 4/2007 |
| CN | 101140458 A | 3/2008 |
| CN | 101460911 A | 6/2009 |
| CN | 101620508 A | 1/2010 |
| CN | 101681161 A | 3/2010 |
| CN | 102096398 A | 6/2011 |
| CN | 102269989 A | 12/2011 |
| CN | 102360207 A | 2/2012 |
| CN | 102736582 A | 10/2012 |
| EP | 0 721 611 B1 | 5/2000 |
| EP | 1 331 536 A1 | 7/2003 |
| EP | 1 566 757 A1 | 8/2005 |
| EP | 2 110 720 A2 | 10/2009 |
| JP | 61-101812 A | 5/1986 |
| JP | 63-257399 A | 10/1988 |
| JP | 02-001516 A | 1/1990 |
| JP | 06-231380 A | 8/1994 |
| JP | 8-220280 A | 8/1996 |
| JP | 2003-504712 A | 2/2003 |
| JP | 2004-005639 A | 1/2004 |
| JP | 2007-536633 A | 12/2007 |
| JP | 2010-123116 A | 6/2010 |
| JP | 2011-123885 A | 6/2011 |
| JP | 2012-59272 A | 3/2012 |
| JP | 2013-033485 A | 2/2013 |
| KR | 20070062446 A | 6/2007 |
| WO | WO-95/09387 A1 | 4/1995 |
| WO | WO-2005/109126 A1 | 11/2005 |
| WO | WO-2007/121227 A2 | 10/2007 |
| WO | WO-2010/122627 A1 | 10/2010 |
| WO | WO-2014/145495 A2 | 9/2014 |
| WO | WO-2014/151559 A2 | 9/2014 |
| WO | WO-2014/151574 A1 | 9/2014 |
| WO | WO-2014/151586 A1 | 9/2014 |

OTHER PUBLICATIONS

Extended European Search for European Patent Application 16193584.6, dated Feb. 9, 2017.
Office Action for Chinese Application No. 201480013960.X, dated Mar. 20, 2017.
International Search Report and Written Opinion for Application No. PCT/US2014/025998, dated Oct. 13, 2014.
International Search Report and Written Opinion for Application No. PCT/US2014/026045, dated Jul. 23, 2014.
International Search Report and Written Opinion for Application No. PCT/US2014/026024, dated Jul. 25, 2014.
International Search Report and Written Opinion for Application No. PCT/US2014/030278, dated Oct. 13, 2014.
Anderson, J. R., et al., "Learning to Program Recursive Functions," in The Nature of Expertise, Chapter 5, pp. 153-183, 1998 (33 pages).
Cook, Maia B. et al., "Situation Displays for Dynamic UAV Replanning: Intuitions and Performance for Display Formats," Proceedings of the Human Factors and Ergonomics Society, 54th Annual Meeting, 2010 (5 pages).
Disessa, Andrea A., "Metarepresentation: Native Competence and Targets for Instruction," in Cognition and Instruction, 22(3), Lawrence Erlbaum Associates, Inc., pp. 293-331, 2004 (23 pages).
Hegarty, Mary et al., "Naive Cartography: How Intuitions about Display Configuration Can Hurt Performance," Cartographica, vol. 44, Issue 3, 2009 (17 pages).
Lowe, Richard K., "Constructing a Mental Representation from an Abstract Technical Diagram," Learning and Instruction, vol. 3, Pergamon Press Ltd., 1993 (24 pages).
Moray, Neville, "Human Factors in Process Control," in Handbook of Human Factors and Ergonomics, Chapter 58, pp. 1944-1971, 1997 (32 pages).

(56) References Cited

OTHER PUBLICATIONS

Moray, Neville, Harmen, "Flexible Interfaces Can Promote Operator Error," in Enhancing Industrial Performance: Experiences of the Human Factor, pp. 49-64, 1992, (12 pages).
Smallman, Harvey S. et al., "Expertise, Spatial Ability and Intuition in the Use of Complex Visual Displays," Proceedings of the Human Factors and Ergonomics Society, 51st Annual Meeting, 2007 (5 pages).
Smallman, Harvey S. et al., "Naive Realism: Folk Fallacies in the Design and Use of Visual Displays," Topics in Cognitive Science 3 (2011), Cognitive Science Society, Inc., 2010 (30 pages).
Office Action for U.S. Appl. No. 14/207,227, dated Aug. 12, 2016.
Office Action for U.S. Appl. No. 14/207,227, dated Feb. 10, 2017.
Office Action for Chinese Application No. 201480014836.5, dated May 3, 2017.
Office Action for Chinese Application No. 201480014886.3, dated Apr. 19, 2017.
Office Action for U.S. Appl. No. 13/859,714, dated Feb. 13, 2017.
Office Action for U.S. Appl. No. 13/859,714, dated Feb. 3, 2016.
Office Action for U.S. Appl. No. 13/859,714, dated May 19, 2017.
Office Action for U.S. Appl. No. 13/859,714, dated May 20, 2016.
Office Action for U.S. Appl. No. 13/859,714, dated Sep. 13, 2016.
Office Action for Chinese Application No. 201480013991.5, dated May 31, 2017.
Second Office Action for Chinese Application No. 201480013960.X, dated Dec. 1, 2017.
Examination Report for European Application No. 14719953.3, dated Dec. 20, 2017.
Examination Report for European Application No. 14723169.0, dated Dec. 20, 2017.
Notice of Reasons for Rejection for Japanese Application No. 2016-502019, dated Jan. 9, 2018.
Notice of Reasons for Rejection for Japanese Application No. 2016-502038, dated Jan. 30, 2018.
Notice of Reasons for Rejection for Japanese Application No. 2016-502030, dated Jan. 10, 2018.
Office Action for Chinese Application No. 201480014886.3, dated Jan. 16, 2018.
Notice of Reasons for Rejection for Japanese Application No. 2016-503366, dated Mar. 20, 2018.
Second Office Action for Chinese Application No. 201480014836.5, dated Mar. 23, 2018.
Office Action for U.S. Appl. No. 14/881,147, dated Apr. 20, 2018.
Second Office Action for Chinese Application No. 201480013991.5, dated Apr. 16, 2018.
Notice of Reasons for Rejection for Japanese Application No. 2016-502019, dated Aug. 7, 2018.
Notice of Reasons for Rejection for Japanese Application No. 2016-502038, dated Aug. 28, 2018.
Third Office Action for Chinese Application No. 201480013991.5, dated Aug. 31, 2018.
Third Office Action for Chinese Application No. 201480014886.3, dated Aug. 15, 2018.
Notice of Reasons for Rejection for Japanese Application No. 2016-502019, dated May 7, 2019.
Decision of Refusal for Japanese Application No. 2016-503366, dated Nov. 13, 2018.
Third Office Action for Chinese Application No. 201480014836.5, dated Oct. 17, 2018.

\* cited by examiner

| | Heater Events | | | |
|---|---|---|---|---|
| Date/Time ▽ | Event | Unit/Parameter | Status/Impact | Action |
| 2/1/2011 14:39 | Switched to Manual Mode | Fuel Oil Flow to H-138 (C-FIC-13803) | | Acknowledged |
| 2/1/2011 16:08 | Temp Lo | H-138 Flue Gas Temp (C-TI-13817) | | Call to maintenance |
| 2/1/2011 16:12 | Drop in Desalter Pressure | Desalter Pressure (C-PIC-13802) | | Reviewed last maintenance record |
| 2/1/2011 16:35 | Hot Crude Charge Lo-Lo | Hot Crude Charge to H-138 Flow (C-FIC-10128) | | |
| 2/1/2011 16:35 | Pump Started | Pump (P-129A) | | |

FIG. 18E

GRAPHICAL PROCESS VARIABLE TREND MONITORING IN A PROCESS CONTROL SYSTEM USING A NAVIGATION PANE

RELATED APPLICATIONS

This application is a regular filed application that claims priority to and the benefit of the filing date of U.S. Provisional Patent Application Ser. No. 61/793,282, entitled "Graphical Process Variable Trend Monitoring for a Process Control System" which was filed on Mar. 15, 2013, and is a Continuation-In-Part of U.S. patent application Ser. No. 13/859,714, entitled "Systems and Methods to Graphically Display Process Control System Information" which was filed on Apr. 9, 2013, the entire disclosures of each of which are hereby expressly incorporated by reference herein.

TECHNICAL FIELD

The present disclosure relates generally to process control systems and, more particularly, to monitoring trends of process variables and hierarchical, graphical navigating of process control plants.

DESCRIPTION OF THE RELATED ART

Process plants, such as those used in chemical, petroleum or other industries, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as increasing or decreasing fluid flow and measuring process parameters. The process controller receives signals indicative of process measurements or process variables made by or associated with the field devices and/or other information pertaining to the field devices, uses this information to implement a control routine and then generates control signals which are sent over one or more of the buses or other communication lines to the field devices to control the operation of the process. Information from the field devices and the controller is typically made available to one or more applications executed by operator workstations to enable an operator to perform desired functions with respect to the process, such as viewing the current state of the process, modifying the operation of the process, etc. As an example, the DeltaV™ control system, sold by Emerson Process Management includes multiple applications stored within and executed by different devices located at diverse places within a process plant.

While a typical process plant has many process control and instrumentation devices, such as valves, transmitters, sensors, etc. connected to one or more process controllers which execute software that controls these devices during the operation of the process, there are many other supporting devices or equipment which are also necessary for or related to process operation. These additional devices include, for example, power supply equipment, power generation and distribution equipment, storage tanks, heaters, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process.

To manage the relative location of and information from the many field devices and pieces of equipment, a configuration application, which resides in one or more operator workstations, enables a designer to create or change operator interfaces which are used by a viewing application to display data to an operator and to enable the operator to change settings, such as set points, within the process control routine. Each dedicated controller and, in some cases, one or more field devices, stores and executes a controller application that runs the control modules assigned and downloaded thereto to implement actual process control functionality. The viewing applications, which may be run on one or more operator workstations, receive data from the controller application via the buses and display this data to process control system designers, operators, or users using the user interfaces, and may provide any of a number of different views, such as an operator's view, an engineer's view, a technician's view, etc. A database application is typically stored in and executed by a database device that collects and stores some or all of the data provided across the buses while a configuration database application may run in a still further computer attached to the buses to store the current process control routine configuration and data associated therewith. Alternatively, the configuration database may be located in the same workstation as the configuration application.

As the complexity of and number of field devices used in a process control environment have increased, different viewing applications, such as graphical display applications, have been provided to enable users such as operators to monitor the process. For example, graphical display applications have been used to enable control operators to view the current functioning of the process plant, or areas of the process plant, or to enable maintenance personnel to view the state of hardware devices within the process plant, to enable simulation of the process plant, etc.

As an example, one type of graphical display application may use a piping (or process) and instrumentation diagram (P&ID) to enable a user to monitor the current functioning of the process plant in real-time. A P&ID generally includes graphical representations of plant equipment and functionality that, together, form a functional plan view of a particular portion of a process. The graphical representations within a P&ID are generally arranged quasi-realistically and so provide a more life-like layout of process control equipment, so that the location of each piece of equipment in the P&ID, in some sense, reflects the layout of the actual equipment in the process plant. For instance the graphical display application may use a P&ID to represent a crude unit in a particular area of the process plant as including several pieces of equipment, such as a heater, a storage tank, a desalter, etc., by depicting each piece of equipment of the crude unit in a spatially representative layout.

Additionally, P&IDs typically allow the operator to monitor parameters (such as process variable values) in the plant in real-time while offering highly user-configurable display options. Unfortunately, however, the display of real-time values in P&IDs does not effectively support the detection of changes in these real-time values over time. In other words, the display of real-time process variable values via the P&ID does not enable the user of the P&ID to easily detect or understand trends within the real-time data being depicted. In fact, because the P&IDs tend to cram real-time values within the screen spaces not used by the equipment depicted in the quasi-spatially realistic display, it may be difficult for a user to see and understand the real-time data itself, much less the temporal trends within that data.

Exacerbating this problem, P&ID developers have more recently attempted to design P&ID displays to reflect more detail associated with process plant equipment or to reflect more complex process plants under the belief that more of such data assists the user in understanding the process better. This push to create more complex P&IDs has lead developers to incorporate, and subsequently display in the P&ID, more information from increasingly complex process plants that include a greater number of equipment and field devices. Besides operating to hide real-time data within more graphical clutter, these more complex P&IDs typically include inconsistent layouts (from P&ID to P&ID), making locating the real-time parameter values harder and harder for users who must switch between multiple different P&IDs. In effect, these recent trends merely exacerbate clutter within the P&IDs, which further slows searches for process parameter data made by the users.

As a result, an operator using a P&ID to monitor a process, may quickly lose focus in the vast amount of information presented in the P&ID or may miss important process variable trends or patterns emerging within the process because the operator is presented with such an expansive amount of detailed data. Moreover, this immense amount of data, especially in a large, complex process plant, is difficult to view, much less to absorb and to understand using only a P&ID and (potentially other supporting graphs or diagrams, such as process variable trend graphs, accessible via the P&ID). As a result, the operator may exert unnecessary time and energy in locating and comparing a current value of a process variable with a setpoint value, a desired value, etc. Moreover, by not detecting or identifying problems during the process more quickly, such as a worsening condition of a particular process variable, etc., the operator may be slow to react to correct a potential runaway process that could result in serious injuries, property damage, environmental contamination, or even death. These "tenor episodes" are likely to occur more frequently when the operator is attempting to monitor a more complex and/or larger plant via a P&ID.

Additionally, navigation within the P&ID of a large-scale, complex process plant may pose difficulties for the operator. Because of the hierarchical nature and the large scope of process plants, navigating to different portions or areas of the process plants via the P&ID may be confusing, difficult, and counterintuitive. Depending on the current hierarchical level or detail level of a representation of the process plant that the control operator is viewing via a P&ID, the operator may have trouble properly determining the current location within the representation of the process plant that is displayed within a viewport within the context of the other areas of the process plant. In current P&ID viewing implementations, while viewing this current location or area of the representation of the process plant at a particular hierarchical level in the P&ID, an operator is provided with a limited number of hyperlinks to navigate throughout the representation of the plant. Each of these hyperlinks which may indicate an area, a unit, or a piece of equipment in the plant, generally appear as text only, and give no indication of their specific location or hierarchical level relative to other areas or units in the plant. That is, there is typically no consistent stimulus-response mapping between the navigation hyperlinks and what these hyperlinks lead to, leaving a less experienced operator with an uncertain feeling when navigating through a series of interconnected P&IDs.

Moreover, the hyperlinks provided to the operator are generally only for navigation within a current hierarchical level and do not provide additional options for navigation throughout the locations and hierarchy within the representation of the process plant. In other words, the P&ID lacks the capability for the operator to "drill down" into more detailed, hierarchical levels while maintaining the context of the entire representation of the process plant. For example, if a different area of the representation of the process plant requires immediate attention of the operator, such as a process variable in the different area that is leading to a runway condition of the process, the operator may have trouble determining, and subsequently navigating to, the location of the different area in the process plant relative to the current location of the process plant. As a result, the operator may endure unpredictable navigation (e.g., trial and error clicking, etc.) during a time critical incident which may lead to poor decision making of the operator through unnecessary stress and frustration.

Likewise, if the operator does successfully navigate to the location of the different area of the identified problem, the control operator may still need to contend with attempting to obtain the proper level of detail of the process control variables. At too high of detail level, the operator may possess too little process control information in viewing only the P&ID. Alternatively, the operator may possess too much detail in viewing multiple process variable trend graphs, in attempting to compare current process variable values with setpoint information, etc. Moreover, the detailed information sources may not be integrated with the P&ID and may require the control operator to view information of various levels of detail that is distributed across multiple separate windows or screens. Possessing too few or too many details may lead to the control operator making incomplete or slow decisions, respectively, that may cause serious consequences during a critical incident or period.

SUMMARY

A process control monitoring system for a process control plant uses graphic trend symbols to assist in detecting and monitoring trends of process variables within the process control plant. A graphic display application within the process control monitoring system may implement and display each graphic trend symbol to graphically indicate or encapsulate current trend and value information of a process variable within the process control plant. In particular, the graphic display application may use process variable data that is collected from field devices and stored in a database to generate one or more graphic elements that are displayed together to form the graphic trend symbol. Each graphic element may represent a different attribute of the process variable associated with the graphic trend symbol and may include graphic trend elements that indicate trend information of the process variable, such as a rate of change of the process variable, a direction of change of the process variable, a change desirability of the process variable, etc. Likewise, the graphic elements may also include graphic value elements that indicate current value information of the process variable, such as a magnitude of the process variable from a desired value, a position of the process variable relative to the desired value, etc. The graphic display application may display one or more of these graphic elements together to form a graphic trend symbol and to graphically or symbolically indicate the current trend or value of the process variable. Moreover, the graphic display application may display the graphic trend symbol in a spatially realistic location within a graphical representation of the process control plant, such as a P&ID, so that the operator may quickly orient herself with the location of the process variable associated with the graphic trend symbol in relation to the area surrounding the graphic trend symbol within the graphical representation.

Advantageously, the graphic display application may display the graphic trend symbol within the graphical representation of the process plant while simultaneously displaying a navigation pane that may provide context to the operator of the hierarchical structure or each hierarchical level (e.g., a particular area, a unit, a piece of equipment etc.) of the process plant in relation to the display graphical representation. Importantly, the graphic display application may also assist the operator in quickly navigating among the different hierarchical levels, via the navigation pane, to monitor the graphic trend symbols within the context of different hierarchical levels within the graphical representation of the process plant. In particular, the graphic display application may constantly and consistently display the navigation pane in the same relative position to the graphical representation to provide predictable and efficient navigation within the graphical representation of the process plant. In particular, the graphic display application may implement the navigation pane to include different types of selector icons in which each selector icon represents a different unit, an area, a piece of equipment, etc. and corresponds to a particular graphical depiction displayed within graphical representation of the plant. Beneficially, the graphic display application displays the different types of selector icons in different types of selection areas for the operator to easily distinguish the different hierarchical levels and corresponding process variables within the process plant while maintaining context in relation to the overall plant. In response to receiving a selection of a selector icon in a particular selection area within the navigation pane, the graphic display application may reposition or change the level of detail of the graphical representation of the process plant according to the selected selector icon.

In displaying the graphic trend symbols within the spatially realistic view of the graphical representation of plant, the graphic display application may additionally provide process variable information views of varied levels of detailed one or more of the process variables that are associated with the displayed graphic trend symbols. Advantageously, the graphic display application may determine to implement one or more process variable information panes of varied levels of detail depending various factors, such as screen space, process variables in a critical state, etc. The graphic display application implements each pane to display a different level of detailed information for the one or more process variables that correspond to the displayed graphic trend symbols within the currently displayed view of the graphical representation. For instance, the graphic display application may display a summary pane that may include only the graphic trend symbol and an associated name of the process variable for one or more graphic trend symbols displayed with the graphical representation. Furthermore, the graphic display application may also display a detailed pane that may include, in addition to the information provided in the summary pane for example, a current process variable magnitude/position value and desired value comparison diagram and/or an actual actuator or value position for the one or more graphic trend symbols displayed with the graphical representation. Moreover, the graphic display application may display an expanded pane that may include, in addition to the information provided in the detailed pane for instance, historical graphs of the process variable. Importantly, the graphic display application may dynamically highlight the graphic trend symbol within the graphical representation and all of the varied detailed views of the corresponding process variable within the panes in response to receiving a selection of a graphic trend symbol within the graphical representation, a selection of the corresponding process variable view within the summary pane, a selection of the corresponding process variable view within the detailed pane, etc.

BRIEF DESCRIPTION OF THE DRAWINGS

For a more complete understanding of the disclosure, reference should be made to the following detailed description and accompanying drawing figures, in which like reference numerals identify like elements in the figures, and in which:

FIG. 18E illustrates an example event history table for display;

DETAILED DESCRIPTION

Figure 1:
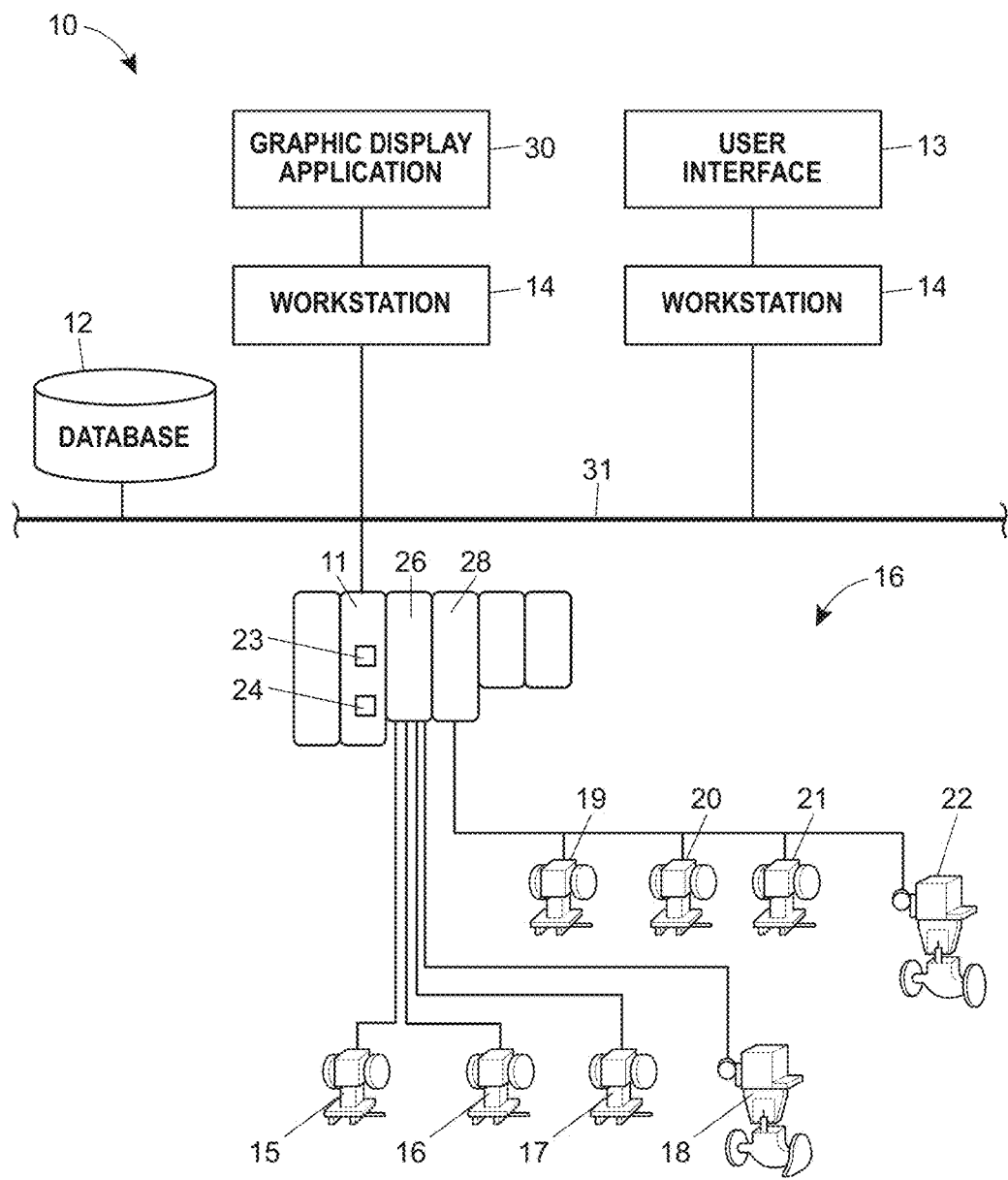
FIG. 1 is a schematic representation of a process control system having a controller (or control element) configured to receive process variable information from a number of field devices via transmitted communications between the controller and the number of field devices in accordance with one aspect of the disclosure.

A process control monitoring system 10 illustrated in FIG. 1 that may be used to implement and to display a graphic trend symbol described herein includes a process controller 11 connected to a database 12 and to one or more host workstations or computers 14 (which may be any type of personal computers, workstations, etc.) via a network bus 31, such as a Ethernet communication network for example. Each workstation 14 may include a memory for storing a plurality of applications including, for example, a graphical display application 30 and may be communicatively coupled to a user interface 13. The controller 11 is also connected to field devices 15-22 via input/output (I/O) cards 26 and 28. The database 12 may be any desired type of data collection unit having any desired type of memory and any desired or known software, hardware or firmware for storing data. The system 10 may also store process variable values or process variable data within the database 12 for use in generating, and subsequently displaying, graphic trend symbols to an operator. The controller 11 is, in FIG. 1, communicatively connected to the field devices 15-22 using a hardwired communication network and communication scheme, or in the alternative, a wireless network and wireless communication scheme.

Generally, the field devices 15-22 may be any types of devices, such as sensors, valves, transmitters, positioners, etc., while the I/O cards 26 and 28 may be any types of I/O devices conforming to any desired communication or controller protocol such as the Fieldbus protocol, the HART protocol, the 4-20ma analog protocol, etc. The valves, sensors, and other equipment illustrated in FIG. 1 may be any desired kind or type of equipment including, for example, Fieldbus field devices, standard 4-20ma field devices, HART field devices, etc. and may be connected to and be controlled by the controller 11 in any desired manner. Also, other controllers may be connected to the controller 11 and to the workstations 14 via, for example, the Ethernet communication line 31 to control other devices or areas associated with the process plant 61 and the operation of such additional controllers may be coordinated with the operation of the controller 11 illustrated in FIG. 1 in any desired or known manner.

The controller 11 includes a processor 23 that implements or oversees one or more process control routines (or any module, block, or sub-routine thereof) stored in a memory 24. Generally speaking, the controller 11 communicates with the devices 15-22, the host computers 14 and the database 12 to control a process in any desired manner. Moreover, the controller 11 may implement a control strategy or scheme using what are commonly referred to as function blocks, wherein each function block is an object or other part (e.g., a subroutine) of an overall control routine that operates in conjunction with other function blocks (via communications called links) to implement process control loops within the process control monitoring system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control monitoring system 10. Of course, hybrid and other types of function blocks exist and may be utilized herein. The function blocks may be stored in and executed by the controller 11 or other devices as described below.

Generally speaking, the process control monitoring system 10 of FIG. 1 may be used to monitor the process of one or more process control plants in which, for example, one of the workstations 14 executes a graphic display application that allows an operator, via the user interface 13, to monitor the process via a spatially realistic graphical representation of the plant and to navigate to different areas of the representation of the process plant within the context of the hierarchical structure of the process plant. In the exemplary process control monitoring system illustrated in FIG. 1, such a graphic display application 30 resides in the workstation 14. However, the graphic display application 30 could be stored and executed in other workstations 14, or in other computers communicatively connected to the bus 31 in any desired manner, including in any wireless manner.

Referring again to FIG. 1, a database 12 may store configuration data including equipment data such as a list of equipment units in the plant and equipment hierarchy, administrative information related to various areas of the plant, association of equipment units with plant areas, hierarchical breakdown of equipment, field device data such as location data for each field device, association of field devices with pieces of equipment, and other configuration data. Also, it will be noted that the database 12 may be a separate server or a group of servers or, if the process plant control monitoring network 10 is sufficiently small, the database 12 may be implemented simply as a dedicated process servicing part of the file system of the one of the workstations 14. Importantly, the system 10 may store both current and historical process variable values collected from the field devices 15-22 or process variable data generated by the graphic display application 30 within the database 12 for use in generating and in displaying graphic trend symbols to the operator, for instance.

In general, an operator may run or execute the graphic display application 30 to implement and to display graphic trend symbols within a graphical representation of the process plant during operation or in a simulation environment. The graphic display application 30 may retrieve or receive process variable information from the database 12 for a particular process variable to generate process variable data and process variable trend data. The graphic display application may use these process variable data and process variable trend data in generating the graphic trend symbol and displaying within the graphical representation of the process plant.

Figure 2:
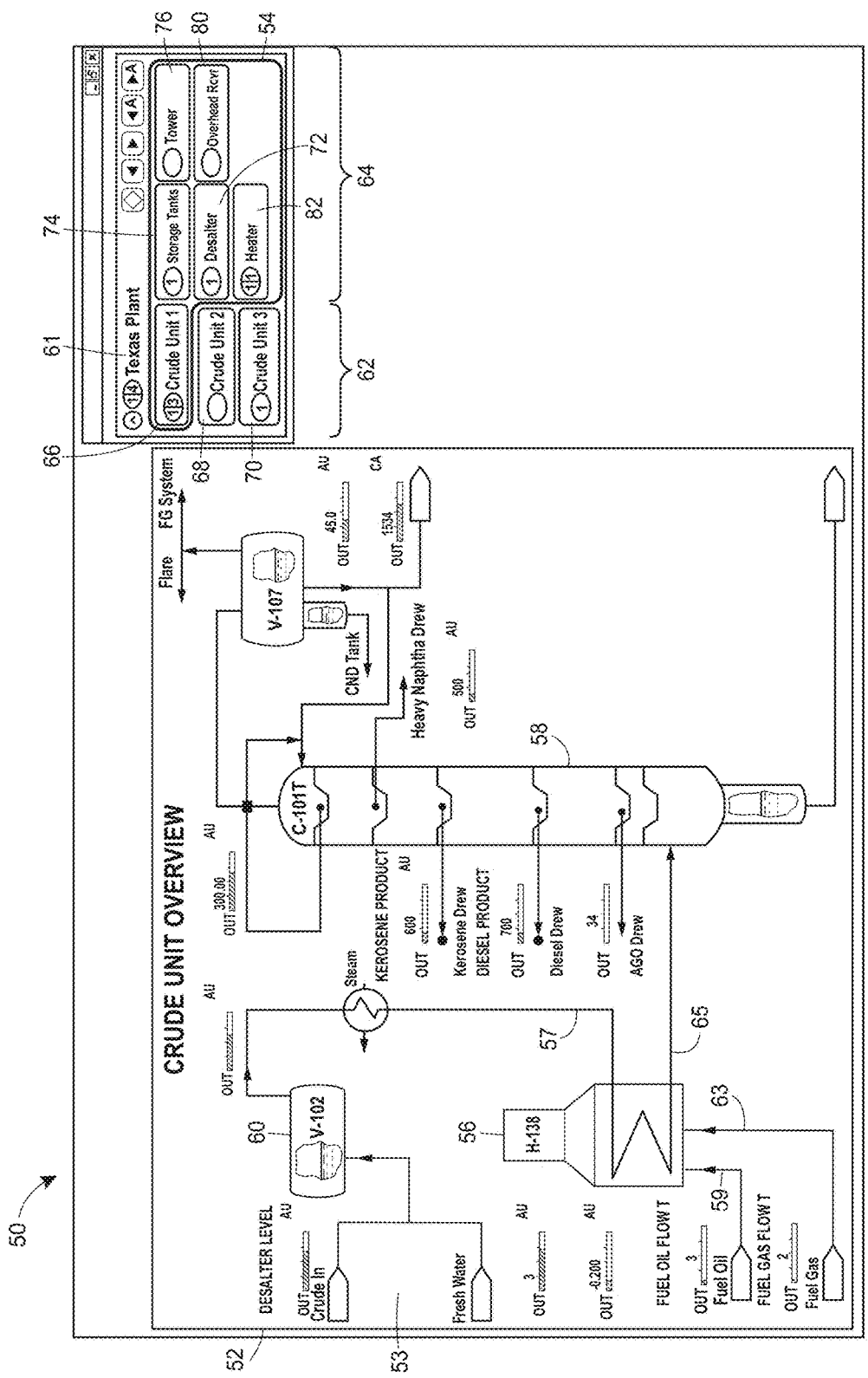
FIG. 2 is a screen shot of a graphical representation of an exemplary crude unit within a portion of a process control plant and a navigation pane for a process control plant.

As illustrated in FIG. 2, for example, the graphic display application 30 presents, to the operator, an exemplary screen shot 50 that includes a graphical representation of a plant component, in this case a crude unit 53, displayed within a viewport 52 and a navigation pane 54. The displayed crude unit graphical representation 53 depicts only a portion of the overall graphical representation of the process plant (i.e., the entire P&ID) and specifically only depicts the equipment included within a crude unit (e.g., labeled, "Crude Unit 1") of the process plant. As seen in FIG. 2, the graphic display application may display the crude unit graphical representation 53 to include a spatially realistic layout (e.g., a P&ID) of the crude unit in the plant that includes graphically realistic depictions of equipment, such as a heater 56, a distillation tower 58, a desalter 60, etc, that compose the crude unit. The graphic display application may display each piece of displayed equipment to include a realistic depiction of the piece of equipment, identifier labels, and any pipes, connections, etc. that may couple the piece of equipment to other pieces of equipment or other inflow/outflow sources, such as fuel oil, fuel gas, water sources, etc. For example, the heater 56 includes a realistic depiction of the heater and an identifier label "H-138" while indicating inputs and outputs associated with the heater 56, such as an inlet for a steam pipe 57, an inlet for a fuel oil pipe 59, an inlet for a fuel oil pipe 63, and an outlet for a crude pipe 65. The graphic display application may display the graphical representation of the crude unit 53 within the viewport 52 to also include specific or critical process variable information for each piece of equipment. For example, as shown in FIG. 2, the graphic display application 30 displays process variable data for several process variables associated with the heater 56, such as inlet pressure, outlet pressure, and crude temperature (discussed in more detailed below).

The navigation pane 54, as shown in FIG. 2, allows the operator to efficiently navigate to graphic trend symbols within the graphical representation of the entire process plant 61, or other process plants, while providing the operator context within a hierarchical framework or structure that reflects the actual hierarchical structure of the process plant. In particular, the navigation pane 54 may allow the operator to quickly recognize the area or the portion of the process plant that is currently displayed within the viewport 52 in context or in relation to the overall representation of the process plant 61. Furthermore, the navigation pane 54 may clearly provide some or all possible location navigation options to the operator for efficiently navigating to a different area of the representation of the process plant regardless of the hierarchical level of the different area of the representation of the process plant. Advantageously, the graphic display application 30 may constantly and consistently display the navigation pane 54 in the same position relative to the viewport 52 within the screen shot 50 to provide predictable and efficient navigation within the representation of the process plant to the operator.

In FIG. 2, the navigation pane 54 may represent a process plant 61 and the associated units and equipment with the process plant 61 in the hierarchical structure of the process plant 61. In particular, the navigation pane 54 includes a unit selection area 62 that includes one or more unit selector icons 66, 68, 70 that, in this example, are labeled "Crude Unit 1," "Crude Unit 2," and "Crude Unit 3," respectively. The navigation pane 54 may also include an equipment selection area 64 that may include one or more equipment selector icons 72-82 that correspond to specific pieces of equipment in the actual plant. In response to receiving a selection of one of the unit selector icons, such as the "Crude Unit 1" unit selector icon 66 for instance, the graphic display application 30 may populate one or more equipment selector icons 72-82 in the equipment selection area 64 that correspond to the one or more pieces of equipment associated or included within the selected unit. For example, as shown in FIG. 2, the graphic display application 30 displays all equipment associated with the selected "Crude Unit 1" unit selector icon 66, which includes a "Desalter" equipment selector icon 72, a "Storage Tanks" equipment selector icon 74, a "Tower" equipment selector icon 76, an "Overhead Rcvr" equipment selector icon 80, and a "Heater" equipment selector icon 82. Of course, the navigation pane 54 of the process control monitoring system 10 may include any number of hierarchical levels and selection areas and is not limited to two hierarchical levels that include units and equipment. Likewise, in response to receiving a selection of the "Crude Unit 2" unit selector icon 68 for example, the graphic display application 30 populates the equipment selection area 64 with equipment selector icons (not shown) associated with or included within the newly selected unit.

Figure 2A:
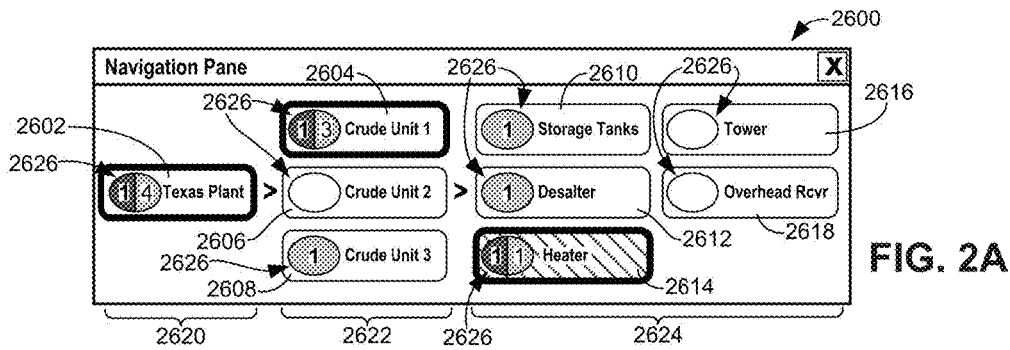
FIG. 2A illustrates another implementation of the navigation pane of FIG. 2.

As an example, FIG. 2A illustrates an example navigation pane 2600 associated with at least a portion of a process control system (e.g., the example process control system 10 of FIG. 1). The example navigation pane 2600 includes multiple navigation buttons 2602, 2604, 2606, 2608, 2610, 2612, 2614, 2616, 2618 grouped or arranged in separate columns 2620, 2622, 2624. Each navigation button 2602, 2604, 2606, 2608, 2610, 2612, 2614, 2616, 2618 corresponds to a particular component (e.g., a plant, an area, a unit, an equipment module, a control module, etc.) in the process control system. Each column 2620, 2622, 2624 corresponds to a different level in a hierarchy of components of the process control system and, therefore, contains the navigation buttons 2602, 2604, 2606, 2608, 2610, 2612, 2614, 2616, 2618 associated with components corresponding to the hierarchy level of each column 2620, 2622, 2624. In the illustrated example, higher or upper levels of components (e.g., parent components) are towards the left and lower levels (e.g., child components or subcomponents) are towards the right. For instance, in the illustrated example of FIG. 2A, the left-hand column 2620 corresponds to the plant level of a hierarchy of the process control system and includes a single navigation button 2602 labeled as "Texas Plant" that corresponds to a single plant in the process control system. The next level down in the hierarchy (corresponding to the middle column 2622) of the illustrated example is the unit level, which contains the navigation buttons 2604, 2606, 2608 respectively labeled as "Crude Unit 1," "Crude Unit 2," and "Crude Unit 3" that correspond to three process units within the plant of the process control system. The next level down in the example hierarchy (and bottom level represented in the example navigation pane 2600 in column 2624) is the equipment module level, which contains the navigation buttons 2610, 2612, 2614, 2616, 2618 respectively labeled as "Storage Tanks," "Desalter," "Heater," "Tower," and "Overhead Receiver" that correspond to five process modules of the process control system. In some examples, the navigation pane 2600 may contain more columns to represent other levels within the process control system hierarchy (e.g., equipment module levels and/or control module levels).

In the illustrated example, each column 2620, 2622, 2624 in the illustrated example corresponds to a single branch of child components associated with a common parent component in the hierarchy. That is, the navigation buttons associated with lower levels in the hierarchy that are shown in the example navigation pane 2600 correspond to components that are a subset of components contained within one of the components represented by one of the navigation buttons in the level immediately above the corresponding lower level. For example, the navigation buttons 2610, 2612, 2614, 2616, 2618 in the right-hand level column 2624 may correspond to process modules that are all associated with the same process unit within the process control system (e.g., the first crude process unit associated with the navigation button 2604 in the middle column 2622). Similarly, each of the three navigation buttons 2604, 2606, 2608 in the middle column 2622 may correspond to process units that are all associated with the same plant (e.g., the plant associated with the navigation button 2602 in the left-hand column 2620). Thus, while the crude process units associated with the navigation buttons 2606, 2608 may have multiple sub-components (e.g., multiple equipment and/or control modules), these are not represented by navigation buttons in the navigation pane 2600 shown in FIG. 2A because they are within branches of the hierarchy other than the one shown. In the illustrated example, the particular branch of each level of the hierarchy that is displayed in the navigation pane 2600 at any given time may be based on a current view (e.g., a current process diagram 304 in the P&ID display area 302) of the process control system.

For example, if the heater module associated with the navigation button 2614) of the first crude process unit associated with the navigation button 2604) is currently being viewed, all the navigation buttons in the branches from the top level (e.g., the plant associated with the navigation button 2602) down to the level associated with the heater module are displayed. As shown in the illustrated example, the sibling components (e.g., components that directly branch from the same parent component one level up the hierarchy) at each level of the hierarchy are also displayed. In some examples, the navigation button corresponding to the specific component currently being viewed (e.g., via the P&ID display area 302) is graphically distinguished from the other navigation buttons. For example, as shown in FIG. 2A, when an operator is viewing a P&ID for the heater module of the first unit of the plant, the navigation button 2614 corresponding to the heater module has a unique visual characteristic (e.g., different pattern) to distinguish it from the remaining navigation buttons. Although the illustrated example shows the navigation button 2614 having a unique pattern, any other visually distinctive characteristic may alternatively be used (e.g., shading, color, shape, size, outline, orientation, symbol, notation, bordering, flashing, highlighting, etc.). Additionally or alternatively, each navigation button in a direct path or line from a top level of the hierarchy (e.g., a plant) down to the particular component (e.g., area, unit, module, etc.) being viewed is graphically altered to be distinguishable from the other navigation buttons. For example, the navigation buttons 2602, 2604, 2614 include a thick border; however, any other visually identifiable characteristic may alternatively be used. In this manner, operators may quickly determine what they are viewing and how it relates to other components within the process control system and the other navigation buttons within the navigation pane 2600.

Figure 2B:
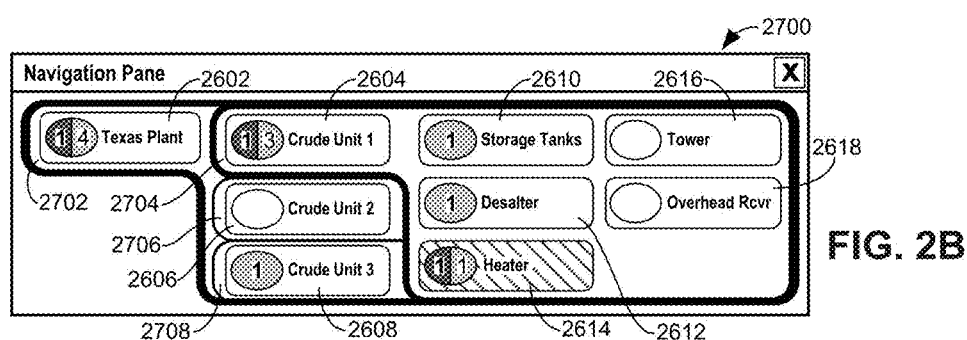
FIG. 2B illustrates another example navigation pane containing the example navigation buttons of FIG. 2A.

Preferably, the graphic display application 30 may indicate the selection of a unit selector icon 66-70 of FIG. 2 by shading the selected unit selector icon (e.g., "Crude Unit 1" unit selector icon 66), for instance, and the background of the equipment selection area 64, as shown in FIG. 2, to indicate that the equipment selector icons 72-82 are associated with the selected unit selector icon 66. Similarly, FIG. 2B illustrates another example navigation pane 2700 associated with the same portion of the example process control system represented in the example navigation pane 2600 of FIG. 2A. The example navigation pane 2700 is similar to the example navigation pane 2600 except that each branch in the hierarchy, including the plant associated with the navigation button 2602) is placed within a separate tab 2702, 2704, 2706, 2708. Accordingly, in the illustrated example, the tabs 2702, 2704, 2706, 2708 associated with each component in the direct line of the hierarchy are brought to a front view and highlighted with a bold outline and/or otherwise graphically identified. The navigation button in FIG. 2B associated with the current view (e.g., the graphical representation 53) of the viewport 52 (e.g., the navigation button 2614 associated with the heater module) is visually distinguished (e.g., via shading, color, pattern, highlighting, outlining, flashing, etc.). In this manner, an operator can visually identify the context of the current view displayed in the viewport 52 relative to the rest of the process control system. Additionally, the outline of the tabs 2702, 2708 serve to graphically represent that each of the three crude process units (represented by the navigation buttons 2604, 2606, 2608) are subcomponents within the plant (represented by the navigation button 2602) and that each of the five process modules (represented by the navigation buttons 2610, 2612, 2614, 2616, 2618) are subcomponents within the first crude process unit (represented by the navigation button 2604).

Figure 2C:
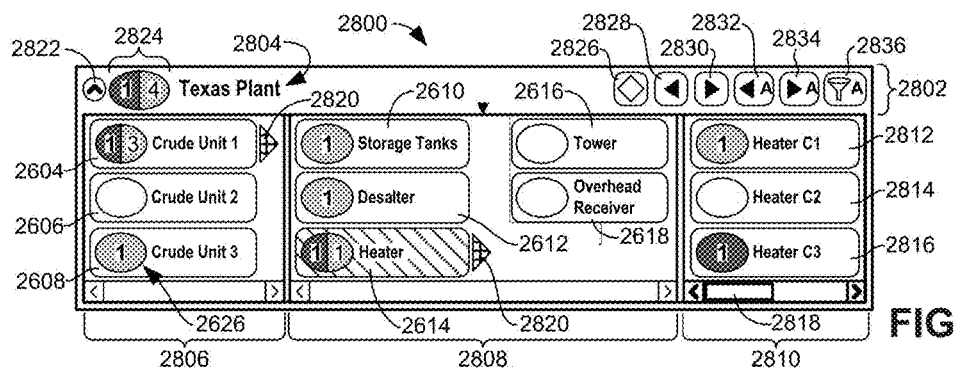
FIG. 2C illustrates another example navigation pane containing the example navigation buttons of FIGS. 2A and/or 2B.

FIG. 2C illustrates another example navigation pane 2800 associated with the same portion of the example process control system of FIGS. 2, 2A, and/or 2B. However, unlike the other example navigation panes, the example navigation pane 2800 includes a top banner 2802 with a title 2804 identifying the top level of the process control system represented in the navigation pane (e.g., the Texas plant). As such, in the illustrated example of FIG. 2C, a left-hand column 2806 corresponds to the unit level of the hierarchy and contains the navigation buttons 2604, 2606, 2608 and a middle column 2808 corresponds to the area level of the hierarchy and contains the navigation buttons 2610, 2612, 2614, 2616, 2618. A right-hand column 2810 of the example navigation pane 2800 includes navigation buttons 2812, 2814, 2816 corresponding to components in the next level down the hierarchy (e.g., equipment and/or control modules). In some examples, each column 2806, 2808, 2810 may have an adjustable width to account for more or less components associated with the corresponding level of the hierarchy. Additionally or alternatively, the columns 2806, 2808, 2810 may contain more navigation buttons than are shown at any one time but may be viewed by using a corresponding scroll bar 2818. The example navigation pane 2800 is similar or identical to the example navigation pane 54 of FIG. 2 except that the navigation pane 2800 shows additional detail and corresponds to the heater module displayed via the viewport 52 rather than the graphical representation of the crude process unit 53 being displayed via the viewport 52 as shown in FIG. 2. In the illustrated example, the top banner 2802 of the example navigation pane 2800 also includes a collapse/expand button 2822 to collapse the example navigation pane 2800 to just the top banner 2802, or to expand the example navigation pane 2800.

In the illustrated example, the lower level components contained within a particular higher level component represented in the example navigation pane 2800 are identified by a marker 2820 (e.g., a triangle or arrow) located next to each higher level navigation button corresponding to the direct line of components in the hierarchy pointing down to the navigation button associated with the currently viewed component. For example, the marker 2820 next to the navigation button 2604 indicates that all the navigation buttons displayed in the lower levels (e.g., the navigation buttons 2610, 2612, 2614, 2616, 2618 in the column 2808 and the navigation buttons 2812, 2814, 2816 in the column 2810) correspond to subcomponents within the first crude process unit of the process control system (i.e., the upper component associated with the navigation button 2604). Similarly, the marker 2820 next to the navigation button 2614 indicates that the navigation buttons 2812, 2814, 2816 correspond to components within the heater module (i.e., the upper component associated with the navigation button 2614). Additionally or alternatively, the direct path of components from the top level of the hierarchy down to the currently viewed component may also be indicated by altering the appearance of the corresponding navigation button(s) along the direct path (e.g., by changing the shading, color, pattern, brightness, outline, etc. of the corresponding navigation button(s) similar to what was described above in connection with FIG. 2A). Furthermore, as with FIGS. 2A and 2B, the navigation button in FIG. 2C associated with the current view (e.g., the graphical representation 53) of the viewport 52 (e.g., the navigation button 2614 associated with the heater module) is visually distinguished (e.g., via a unique shading, pattern, color, shape, size, outline, orientation, symbol, notation, flashing, highlighting, etc.) Of course any suitable manner of indicating that the equipment selector icons 72-82 and the equipment selection area 54 are associated with the selected unit selector icon 66 may be employed, such as displaying an identical symbolic indicator (e.g., an asterisk in the upper corner of the selector icon, etc.) in each equipment selector icon displayed in the selected unit selector icon (not shown), etc.

Figure 2D:
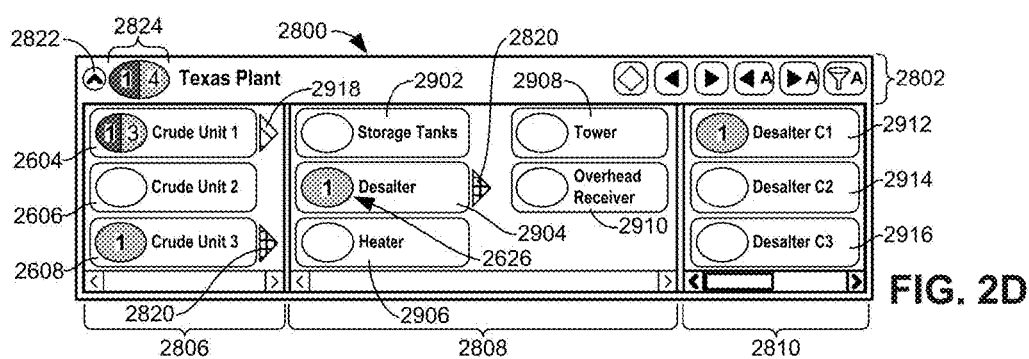
FIG. 2D illustrates another view of the example navigation pane of FIG. 2C.

As will be described in greater detail below, selecting (e.g., via a mouse click) anyone of the navigation buttons may change the current view (e.g., the graphical representation 53 in the viewport 52) of the process control system to correspond to the component selected. In this manner, in addition to providing contextual awareness to operators regarding the current view relative to other components as well as the alarm state of the components, the example navigation pane 2800 enables an operator to quickly navigate to any component in the process control system and bring up the corresponding P&ID and/or other information for further analysis. In other examples, selecting (e.g., via a mouse click) one of the navigation buttons may not immediately change the process diagram 304 to the selected component but merely give a preview of the selected component within the navigation pane. For example, an operator may be viewing the example navigation pane 2800 as shown in FIG. 2C and want to know the source of the single alarm indicated in the alarm summary icon 2626 of the navigation button 2608 corresponding to the third crude process unit of the process control system. To do so, an operator may select the navigation button 2608 in the left-hand column 2806 to then update the remaining columns 2808, 2810 to show navigation buttons associated with the subcomponents of the third crude process unit as indicated in FIG. 2D. That is, upon selecting the navigation button 2608 in the example navigation pane 2800 of FIG. 2C, the marker 2820 is displayed next to the navigation button 2608 to indicate that the middle column 2808 has been repopulated with new navigation buttons 2902, 2904, 2906, 2908, 2910 corresponding to the components within the third crude process unit of the process control system. Then, upon selecting the navigation button 2904 (indicated as the source or location of the alarm based on the alarm summary icon 2626), the right-hand column will be populated with navigation buttons 2912, 2914, 2916 and another marker 2820 will be displayed next to the navigation button 2904 to indicate that the navigation buttons 2912, 2914, 2916 in the third column 2810 correspond to subcomponents within the desalter module represented by the navigation button 2904.

Although the content of the columns 2806, 2808, 2810 between the example navigation pane 2800 shown in FIGS. 2C and 2D is different, in some examples, the navigation pane 2800 of FIG. 2D is a preview of the desalter module of the third crude process unit such that the P&ID of the heater module of the first crude process unit will remain on display in the graphical representation 53. In some examples, navigating to a preview display in the navigation pane 2800 may be accomplished by selecting the corresponding navigation buttons in a first manner (e.g., a single mouse click) and actually navigating to a new portion of the process plant (e.g., with a different graphical representation 53) may be accomplished by selecting the corresponding navigation button in a second, different manner (e.g., a double mouse click).

As described above, the markers 2820 next to the navigation buttons 2608, 2904 of FIG. 2D and/or the distinctive appearance (e.g., based on shading, color, pattern, border, notation, etc.) of the navigation buttons 2608, 2904 of FIG. 2D indicate the relationship of the navigation buttons in each column 2806, 2808, 2810 (e.g., the branches and/or paths of the hierarchy) that are currently being displayed. However, when a preview navigation pane is shown (e.g., the navigation pane 2800 of FIG. 2D), the navigation button corresponding to the particular component actually being displayed in the graphical representation 53 may be hidden (e.g., the navigation button 2614 of FIG. 2C). Accordingly, as shown in the example navigation pane 2800 of FIG. 2D, a separate marker 2918 may be shown next to the navigation button corresponding to the branch of the hierarchy of the process control system associated with the currently viewed component in the graphical representation 53. Additionally, the marker 2918 may be different in appearance (e.g., based on color, pattern, outline, shape, notation, etc.) than the markers 2820 described above to distinguish the purposes of the markers 2820, 2918. In some examples, the unique visual characteristic of the marker 2918 may correspond to the visually distinguishing feature (e.g., color, pattern, shading, highlight, border, etc.) of the navigation button associated with the component corresponding to the graphical representation 53 (e.g., the navigation button 2614 of FIG. 2C).

As shown in FIGS. 2C and 2D, the top banner 2802 includes a P&ID display button 2826 that returns the example navigation pane 2800 to show the navigation buttons associated with the component in the process control system currently being displayed via the graphical representation 53. For instance, if an operator were to select (e.g., mouse click) the P&ID display button 2826 after navigating to the preview navigation pane 2800 shown in FIG. 2D, the navigation pane 2800 would return to the view shown in navigation pane 2800 of FIG. 2C corresponding to the heater module that is currently being displayed in the P&ID display area 302. In some examples, the top banner 2802 may also include a back button 2828 and a forward button 2830 to browse back and forth between different views that an operator has navigated through while using the navigation pane 2800. Additionally or alternatively, the top banner 2802 also includes a previous alarm button 2832 and a next alarm button 2834 to skip back and forth between pages (e.g., graphical representations 53 of the process plant within the viewport 52) that are associated with at least one process variable currently in an alarm state. Furthermore, the top banner 2802 may include an alarm filter button 2836 to reconfigure the navigation pane 2800 to only show navigation buttons associated with components that include at least one process variable under an alarm state and/or to filter the navigation pane 2800 to only show navigation buttons associated with high-criticality alarms. Additionally or alternatively, a separate sort button may be provided to sort and/or filter the navigation buttons in other manners (e.g., sort by alphabetical order, engineered order, order of severity, etc.).

Figure 3:
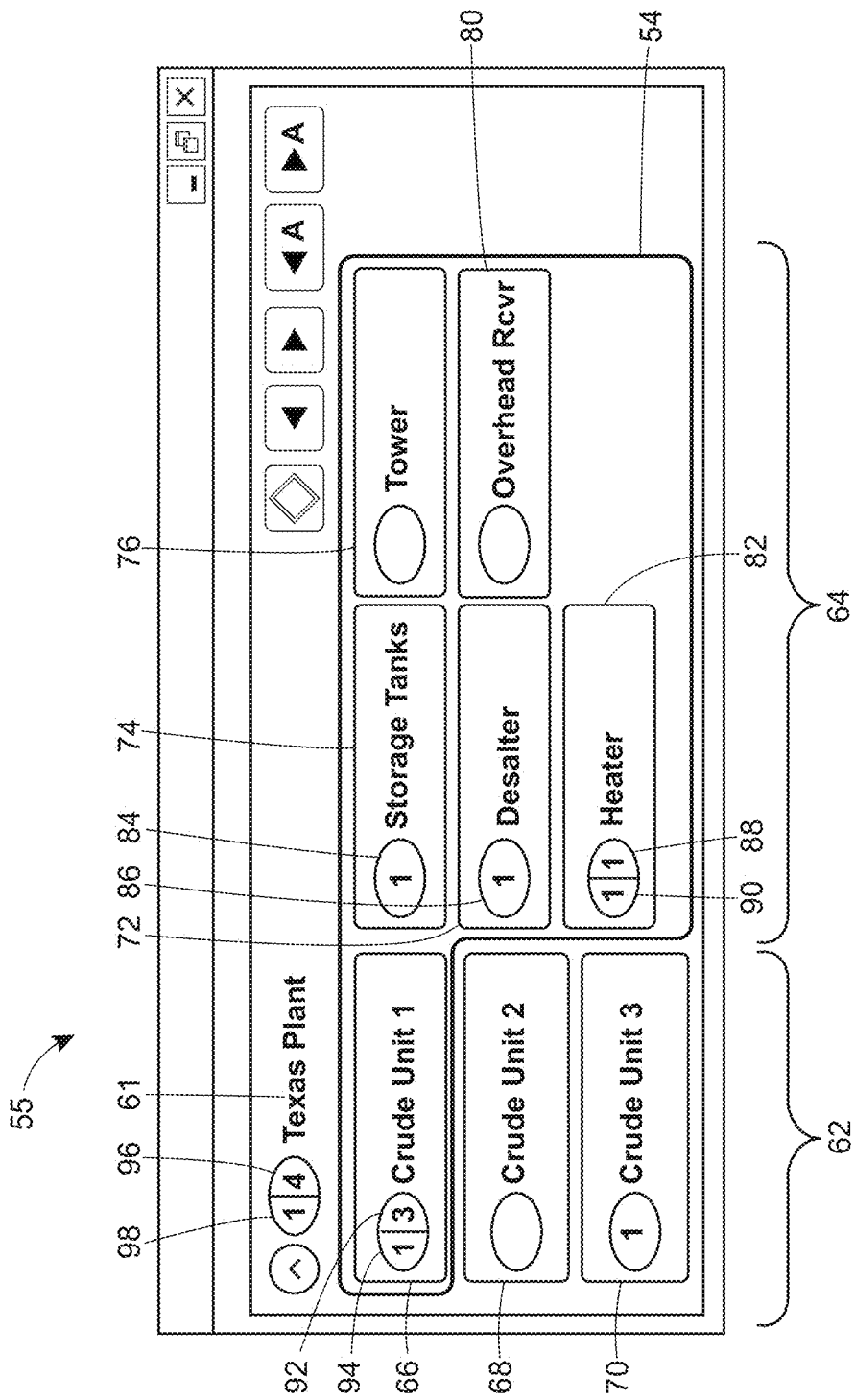
FIG. 3 is a detailed view of a navigation pane for a process control plant.

Referring now to FIG. 3, the screen shot 55 displays a detailed view of the navigation pane 54 that may further include process variable alarm indicators 84-98 or badges that indicate different types of alarms occurring for process variables that are associated with the displayed equipment selector icons 72-82, unit selector icons 66-70, and the plant 61. For example, the alarm indicator 84 associated with the "Storage Tanks" equipment selector icon 74 is low priority alarm that indicates a less urgent state condition for a particular process variable associated with the storage tanks in the process plant. Because the alarm indicator 84 associated with the "Storage Tanks" equipment selector icon 74 is associated with lower priority alarm, the graphic display application 30 may display the alarm indicator 84 with a particular color, shading, symbol indicator, or any other suitable manner to indicate a lower priority alarm. However, if an alarm indicator is associated with a higher priority alarm, such as an alarm indicator 90 associated with the "Heater" equipment selector icon 82, the graphic display application 30 may display the alarm indicator 90 in a color, shading, symbol indicator, etc. different from the lower priority alarm. Moreover, one selector icon 66-82 may indicate both a lower priority alarm and a higher priority alarm for two or more process variables associated with the particular selector icon. For example, as shown in FIG. 3, the graphic display application 30 displays one lower priority alarm 88 and one higher priority alarm 90 that are associated with the "Heater" equipment selector icon 82. Of course, any number of priority alarm levels may be used with the alarm indicators 84-98.

Advantageously, the graphic display application 30 associates each process variable alarm with a corresponding graphic trend symbol located within the graphical representation of the process plant and may aggregate each process variable alarm by alarm level priority and by hierarchical level or portion within the process plant corresponding to the location of the graphic trend symbol. For example, as shown in FIG. 3, the graphic display application 30 aggregates the three lower priority alarms 84-88 (e.g., the lower priority alarm 84 associated with the "Storage Tanks" equipment selector icon 74, the lower priority alarm 86 associated with the "Desalter" equipment selector icon 72, and the lower priority alarm 88 associated with the "Heater" equipment selector icon 82) and labels the lower priority alarm indicator 92 associated with the "Crude Unit 1" unit selector icon 66 with a "3" to indicate to the operator that three lower priority alarms associated with three process variables (and corresponding graphic trend symbols) are currently occurring in the "Crude Unit 1" unit. Likewise, for example, the graphic display application 30 may aggregate the higher priority alarms for each higher hierarchical level in the process plant. For instance, the only one higher priority alarm associated with any of the equipment selector icons 72, 74, 82 associated with the "Crude Unit 1" unit selector icon 66 is the higher priority alarm 90 associated with the "Heater" equipment selector icon 82. The graphic display application 30 displays this one higher priority alarm indicator 90 associated with the "Heater" equipment selector icon 82 by labeling the higher priority alarm indicator 94 associated with the "Crude Unit 1" unit selector icon 66 with a "1" to indicate to the operator that only one higher priority alarm associated with one process variable is occurring in the "Crude Unit 1" unit. As a result, the operator may quickly identify the number of and priority level of process variable alarms for a particular plant, unit, piece of equipment, etc. via the aggregate alarm indicators for different hierarchical entities represented within the navigation pane 54.

The graphic display application 30 allows the operator to quickly navigate to a particular graphic trend symbol within a portion or area of the graphical representation of the process plant by using the selector icons of the navigation pane and visually associating the portion or area of the graphical representation. Referring now to a screen shot 100 of FIG. 4, for instance, the graphic display application 30 additionally may allow the operator to visually identify, within the P&ID, a particular unit, piece of equipment, etc. that is associated with an indicated selector icon within the navigation pane 54. For instance, in response to detecting an operator-initiated hover event (e.g., a mouse, finger contact point, or any other suitable way to indicate a selector icon without confirming a selection) near or over the "Heater" equipment selector icon 82 of the navigation pane 54, the graphic display application 30 only highlights the corresponding graphical depiction of the heater 56 in the crude unit graphical representation 53 within the viewport 52. The graphic display application 30 may additionally highlight the "Heater" equipment selector icon 82 within the navigation pane 54 in conjunction with highlighting the graphical depiction of the heater 56 to further provide context to the operator by visually conveying, via the navigation pane 54, the hierarchical position of the heater within the hierarchical structure of the process plant.

Figure 4:
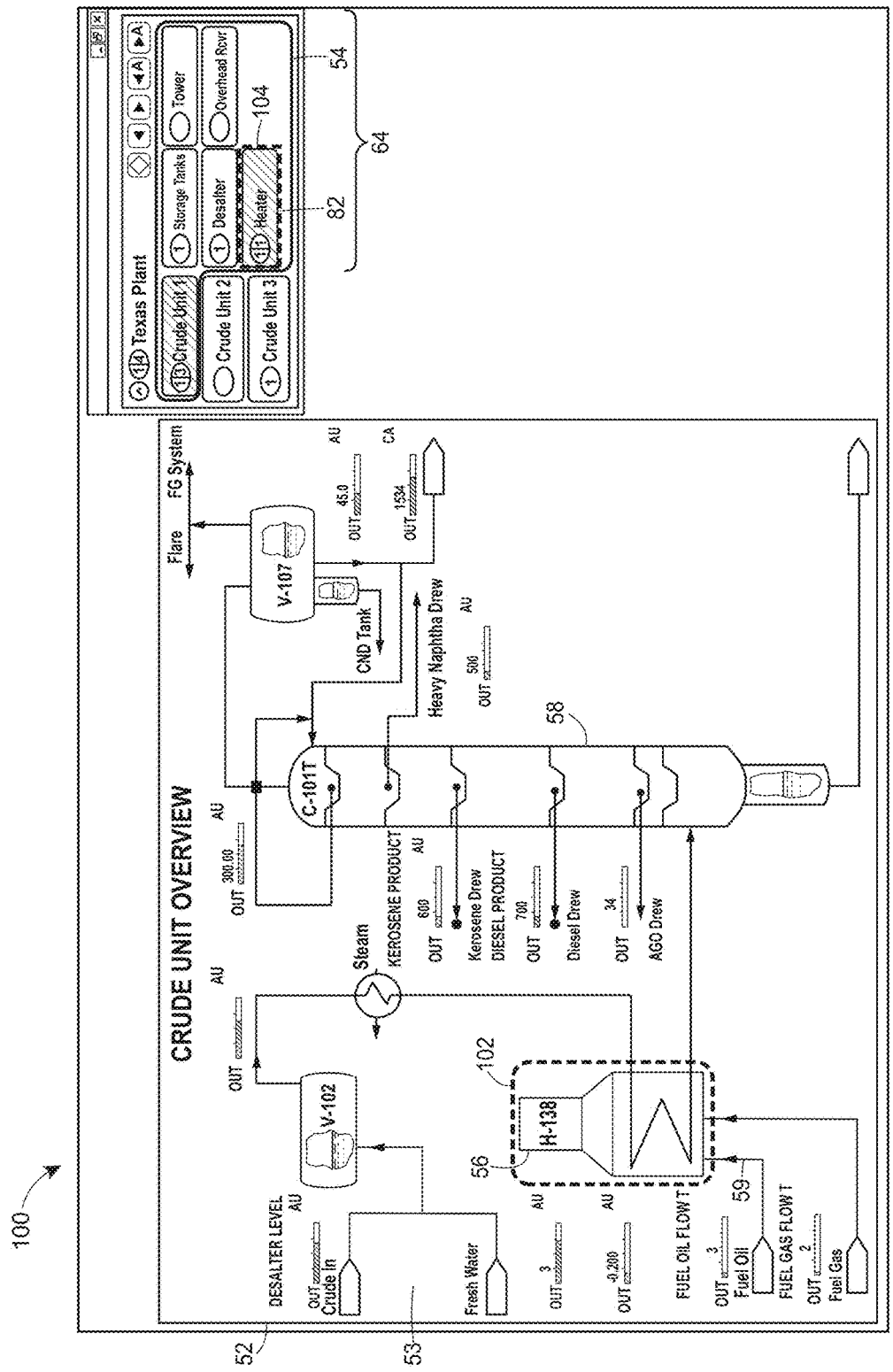
FIG. 4 is a screen shot of a highlighted graphical representation of a heater within a graphical representation of an exemplary crude unit within a portion of a process control plant and a navigation pane for a process control plant.

The graphic display application 30 may highlight the equipment selector icon 82 and the graphical depiction of the heater 56, for instance, using a highlighted border 104, 102, as shown in FIG. 4, or in alternative, may entirely shade the equipment selector icon 82 and graphical depiction 56 with a color different from other colors appearing in the graphical representation of the crude unit 53, or may use any other suitable means to highlight the equipment selector icon 82 and graphical depiction 56 of the heater. Thus, if the operator performed a hover event near or on another equipment selector icon in the equipment selection area 64 (i.e., equipment included in or situated a hierarchical level below the "Crude Unit 1" area of the process plant), the graphic display application 30 highlights the corresponding graphical depiction within the graphical representation of the crude unit 53 within the viewport 52. In this manner, the operator may quickly identify the location of a particular graphic trend symbol (or a piece of equipment that includes the particular graphic trend symbol) within the graphical representation while maintaining context relative to the overall process plant via hovering over various selector icons on the navigation pane.

Figure 5:
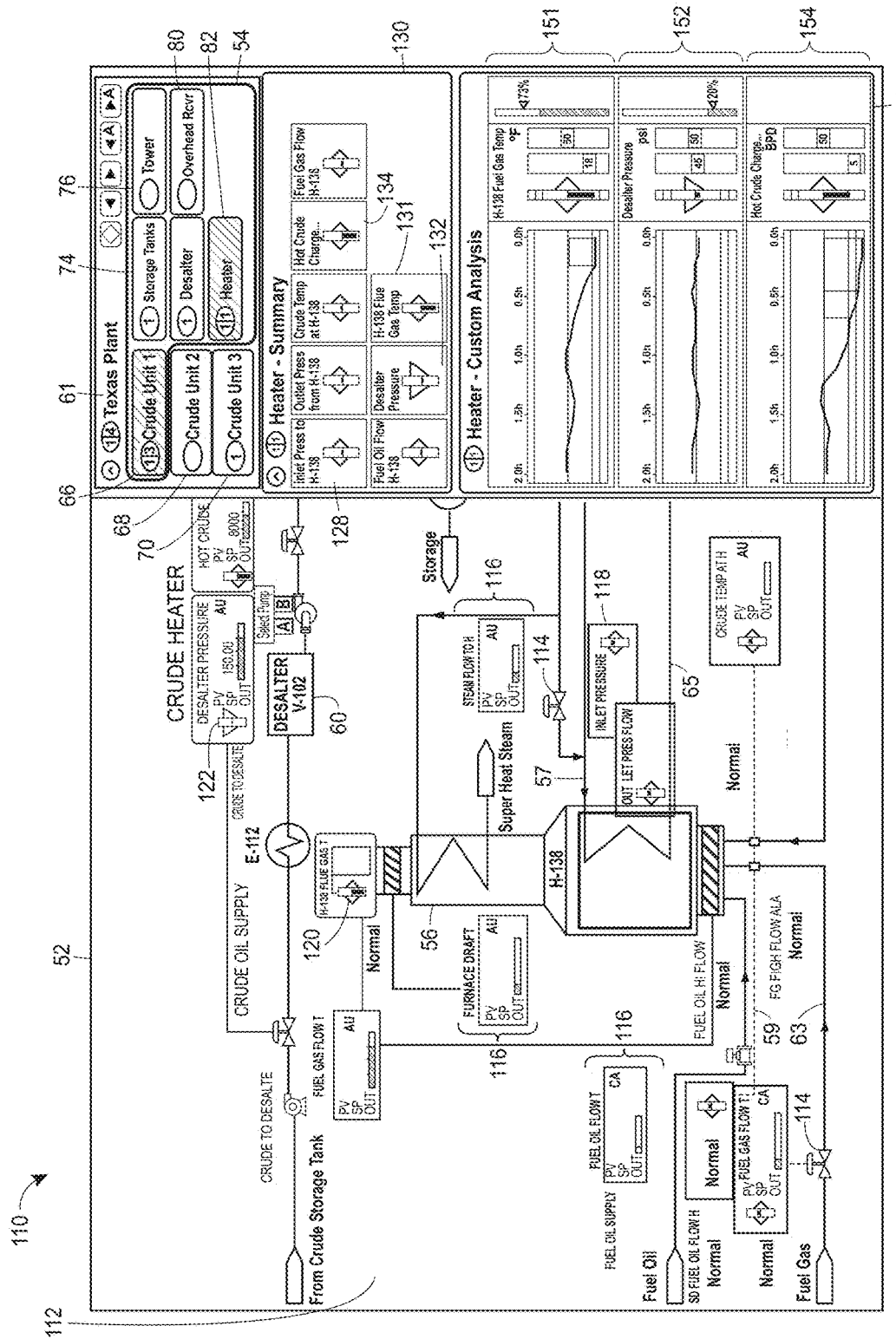
FIG. 5 is screen shot of a graphical representation of an exemplary heater within a portion of a process control plant, a navigation pane, a summary pane, and an expanded pane.

Moreover, in response to determining the location of the particular graphic trend symbol, the operator may desire to see a more detailed view of the location or area of the particular graphic trend symbol within the graphical representation. Advantageously, the operator may confirm a selection of a selector icon associated with the desired area to reposition or to change the detail level (e.g., zoom in, zoom out, etc.) of the portion of the graphical representation of the process plant that is display within the viewport. For example, upon receiving a confirmation selection, via a command or control input, click, tapping gesture, etc., of one of the unit selector icons 66-70 or equipment selector icons 72-82, the graphic display application 30 may display a different portion of the graphical representation of the process plant 61 that is associated with the selected selector icon. For example, in response to a confirmation selection of the "Heater" equipment selector icon 82, the graphic display application 30 may display a graphical representation of the heater 112, as shown in FIG. 5, that is associated with the selected "Heater" equipment selector icon 82. With continued reference to FIG. 5, a screen shot 110 includes the graphical representation of the heater 112 that is associated with the confirmation selected "Heater" equipment selector icon 82 displayed within the viewport 52, the navigation pane 54, a process variable summary pane 130, and a process variable expanded pane with historical graphs 150. In this example, this graphical representation of the heater 112 of FIG. 5 is a subset of the graphical representation of the crude unit 53 and additionally provides more detailed information of the heater than provided in the graphical representation of the crude unit.

Importantly, the operator may efficiently monitor the current trend and values for each process variable via each corresponding displayed graphic trend symbol within a portion of the graphical representation of the process plant. Moreover, the graphic display application 30 displays each graphic trend symbol in a spatially realistic location within the graphical representation of the process plant so that the operator may quickly recognize the location of a field device associated with a particular process variable in relation to the entire process plant. For example, the graphical representation of the heater 112 may include a more detailed view of the inlets 57, 59, 63 into and outlet 65 from the heater 56, valves 114, nearby pieces of equipment to the heater 56 (e.g., the desalter 60), process variable data 116, and graphic trend symbols 118-122. Each graphic trend symbol 118-122 may correspond to a monitored process variable in the process control system and visually represent real-time information about the process variable. Moreover, in addition to the graphic trend symbols 118-122 displayed in the graphical depiction of the heater 112, for example, the graphic display application 30 may also display a summary view of the corresponding graphic trend symbols 128-132 in the summary pane 130, a detailed view of the corresponding graphic trend symbols in a detailed pane (described below), and/or the expanded view of the corresponding graphic trend symbols 151-152, including historical graphics for example, in the expanded pane 150.

Figure 6:
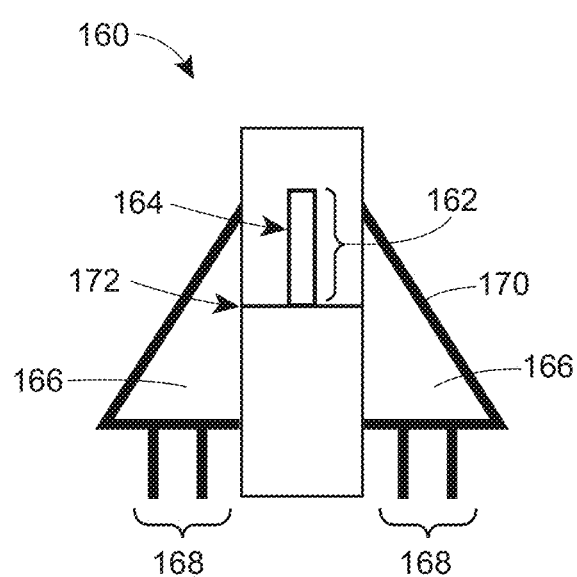
FIG. 6 is a view of an exemplary graphic trend symbol.

Referring now to FIG. 6, an exemplary graphic trend symbol 160 graphically encapsulates process control information related to a process variable and visually conveys this graphically encoded information to the operator. For example, the graphic trend symbol 160 may represent a pressure, a temperature, etc. of process variable associated with a field device and may include various graphic elements 162-170, each representing a different attribute of the process variable and a desired value 172 (e.g., a setpoint, a target point, etc.) that indicates a normal or intended value for the process variable. The graphic elements 162-170, for instance, may include both graphic trend elements 166-170 that represent trends of the process variable and graphic value elements 162, 164 that represent current values of the process variable. These process variable attributes may include, for instance, a magnitude of the process variable from the desired value (e.g, a setpoint value), a position of the process variable relative to the desired value, a direction of change of the process variable, a rate of change of the process variable, a change desirability of the process variable, etc.

The graphic display application 30 may implement these graphic elements 162-170 associated with the process variable attributes in retrieving or receiving the current and historical process variable values from the database 12 for a particular process variable to generate process variable data and process variable trend data. The graphic display application 30 generates process variable data to indicate the current values or positions of the process variable, such as a magnitude of the process variable from a desired value, a position of the process variable relative to the desired value, etc. Likewise, the graphic display application 30 generates process variable trend data to indicate the current trend of the process variable, such as a rate of change of the process variable, a direction of change of the process variable, a change desirability of the process variable, etc. The graphic display application 30 may utilize process variable current and/or historical updates to generate and to display each graphic element that together form the graphic trend symbol.

For example, the graphic trend symbol 160, as illustrated in FIG. 6, includes a magnitude graphic value element 162 that is associated a magnitude of the process variable from the desired value, a position graphic value element 164 that is associated with the position of the process variable relative to the desired value, a direction of change graphic trend element 166 that is associated with a direction of change of the process variable, a rate of change graphic trend element 168 that is associated with a rate of change of the process variable, and a change desirability graphic trend element 170 that is associated with the change desirability of the process variable. Of course, any number or type of process variable attributes may be used in implementing the graphic trend symbol 160. Moreover, the graphic display application 30 may display the layout of the graphic elements 162-170 and desired value 172 in any arrangement. Preferably, none of the graphic elements may occlude any other graphic element so that any number of possible combinations of graphic elements may be implemented and displayed to the operator.

The magnitude graphic value element 162, as shown in FIG. 6, may be depicted as a bar, a column, a line, etc. and graphically represents the magnitude of the process variable from the desired value 172 in a relative manner such that a depiction of a longer bar, for instance, indicates a greater magnitude in the current value of the process variable. For example, the graphic display application 30 may retrieve a current value of the process variable associated with the graphic trend symbol from the database 12 and generate the magnitude graphic value element 162 based on the current raw value. Of course, the graphical display application 30 may determine or generate the magnitude graphic trend element 162 in any suitable manner. The graphic display application 30 may generate a normalized value using a normalized scale that reflects a ratio of the current raw value of the magnitude to a maximum value of the process variable that the field device is physically capable of reading or to a maximum value that is an operator-imposed limit, ceiling, etc. of the process variable (e.g., when the current value is at the maximum value of the process variable, the magnitude graphic value element 162 may reflect a 100% ratio level). In another example, the graphic display application 30 may fix the desired value 172 (e.g., the setpoint) at a 50% ratio level and adjust the current value of the process variable relative to this 50% desired value 172 ratio level. As another example, if the magnitude value for one magnitude graphic value element 162 is twice as large as the magnitude value of another magnitude graphic value element 162, then the graphic display application 30 may depict the bar of the first magnitude graphic value element 162 twice as long as the bar of the second magnitude graphic value element 162. Alternatively, the graphic display application 30 may display the bar of the first magnitude graphic value element 162 relatively longer than the second magnitude graphic value element 162.

Figure 7:
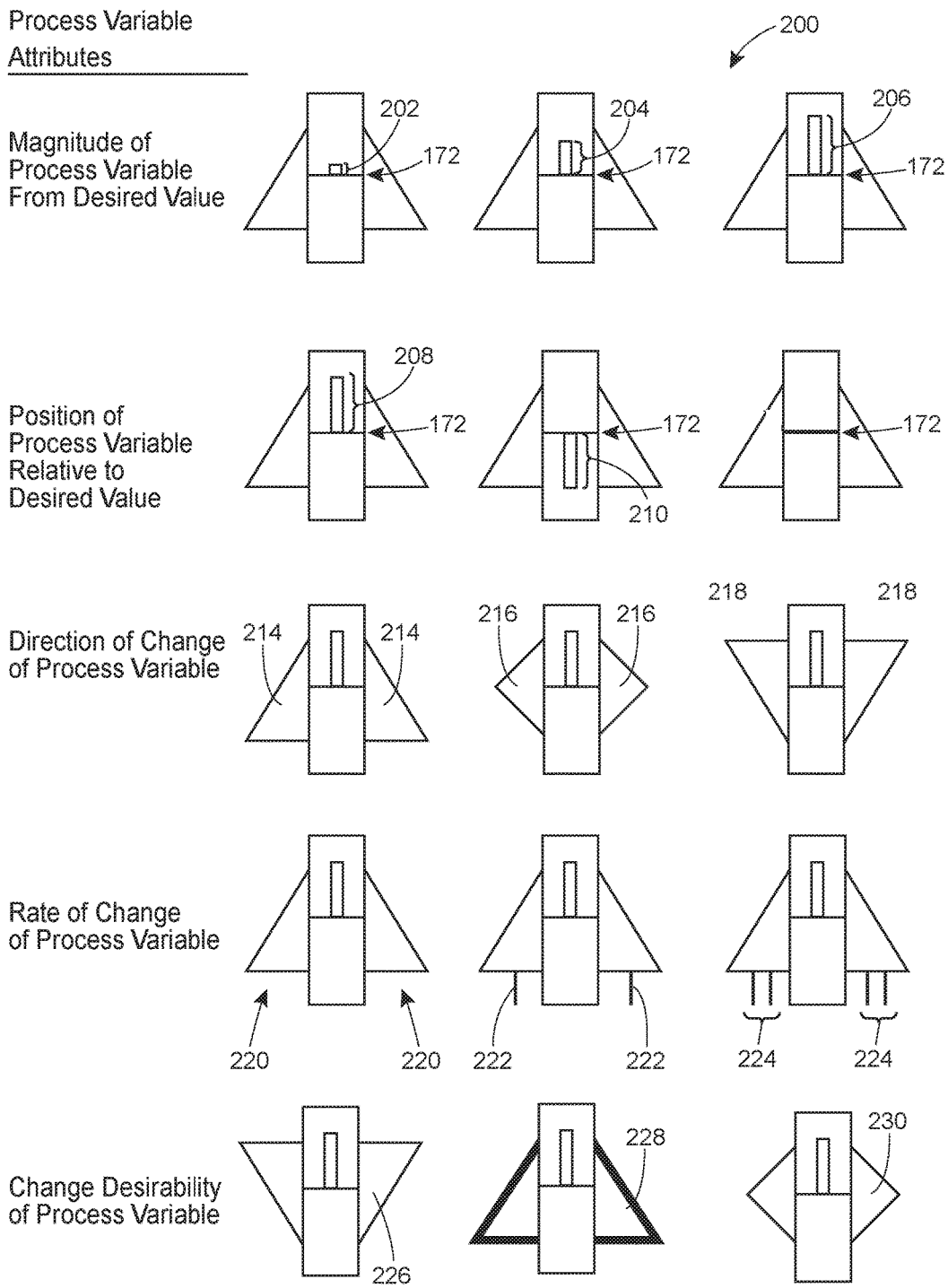
FIG. 7 is a process variable attribute chart useable to create graphic trend symbols.

Referring now to FIG. 7, an example the various bar lengths for the magnitude graphic value element 162 is found in a process variable attribute chart 200 that includes various examples of process variable attributes arrangement by row. The first row includes three different values of the graphic trend symbol 160 for three different magnitude values of the process variable. As shown in FIG. 7, for example, the value of the magnitude graphic value element 202 represents a relatively smaller magnitude value (i.e., closer to the desired value 172) than the value of the magnitude graphic value elements 204, 206. Likewise, the value of the magnitude graphic value element 204 represents a relatively smaller magnitude value than the value of the magnitude graphic value element 206, but larger than the value of the magnitude graphic value element 202. The value of the magnitude graphic value element 206 represents a magnitude value that is relatively further away from the desired value 172 compared to the other two values of the magnitude graphic value element 202, 204. If the magnitude value is greater than a certain threshold for example, the graphic display application 30 may trigger a process variable alarm within the process system and incorporate the triggered process variable alarm in determining the counts displayed within the process variable alarm indicators 84-98 as shown in FIG. 3. Additionally, the graphic display application 30 may compare the value of the magnitude value to two different thresholds to determine a lower priority alarm and a higher priority alarm, such as described above in reference to the process variable alarm indicators 84-98.

Referring back to FIG. 6, the position graphic value element 164 may be depicted as the position or the location of the magnitude bar, namely whether the magnitude bar of the magnitude graphic value element 164 is above, below, or at the desired value 172. For example, the graphic display application 30 may retrieve a current value of the process variable and desired value 172 associated with the graphic trend symbol from the database 12 and generate the position graphic value element 162 based on the current raw value in relation to the desired value 172. Of course, the graphical display application 30 may determine or generate the position graphic trend element 164 in any suitable manner. In the graphic trend symbol 160 of FIG. 6, the value of the position graphic value element 164 is displayed above the desired value 172 indicating that the current process variable value is above the desired value 172. As an example as shown in the second row of chart 200 of FIG. 7, the graphic display application 30 may position and display the value of the position graphic value element 208 above the desired value 172 to indicate that the current process variable value is above the desired value 172 when implementing the graphic trend symbol 160. Alternatively, the graphic display application 30 may position and display the value of the position graphic value element 210 below the desired value 172 to indicate that the current process variable value is below the desired value 172. Additionally, when the current process variable value is identical or substantially close to the desired value 172, the graphic display application 30 may display only the desired value 172.

Referring back to FIG. 6, the direction of change graphic trend element 166 may be depicted, for example, as two flanking triangles that point toward the direction of change of the process variable. Of course, the graphic display application 30 may create the direction of change graphic trend element 166 using any other shapes, arrows, repetitive animations, graphical indications, or any other suitable manner of indicating the rate of change of a process variable. For example, the graphic display application 30 may retrieve a current and one or more historical values of the process variable associated with the graphic trend symbol from the database 12 and generate the direction of change graphic value element 166 based on the difference between the current raw value and at least one historical raw value. Of course, the graphical display application 30 may determine or generate the direction of change graphic trend element 166 in any suitable manner. The direction of change graphic trend element 166 may indicate one of a plurality of direction of change categories, in which each direction of change category is associated with a direction of change value that may include a direction toward the desired value 172, a direction away from the desired value 172, or no movement relative to the desired value 172. As an example, the direction of change graphic trend element 166 of FIG. 6 indicates that the process variable is moving away from the desired value 172 because process variable magnitude is increasing while the process variable position is above the desired value 172. Referring to FIG. 7, in the third row of the chart 200 includes several examples of this direction of change attribute via the different direction of change graph trend elements 214-218. For instance, the value of the direction of change graphic trend element 214 indicates that the direction of change of the process variable is away from the desired value 172 (thus is getting worse) because the process variable is increasing and the position of the process variable is above the desired value 172. Alternatively, the value of the direction of change graphic trend element 218 indicates that the direction of change of the process variable is toward the desired value 172 (thus is getting better) because the process variable is decreasing and the position of the process variable is above the desire value 172. An additional example includes the value of direction of change graphic trend element 216 that indicates that the direction of change of the process variable is stationary regardless of the position of the process variable being above or below the desired value 172 (thus not getting better or worse.)

Referring back to FIG. 6, the rate of change graphic trend element 168 may be depicted, for example, as two marks protruding from the graph trend symbol 160. Of course, the graphic display application 30 may create the rate of change graphic trend element 168 using any other shapes, arrows, repetitive or flashing animations, graphical indications, or any other suitable manner of indicating the rate of change of a process variable value. For example, the graphic display application 30 may retrieve a current and one or more historical values of the process variable associated with the graphic trend symbol from the database 12 and generate the rate of change graphic value element 168 based on the difference between the current raw value and at least one historical raw value and a time lapse. Of course, the graphical display application 30 may determine or generate the rate of change graphic trend element 168 in any suitable manner. The rate of change graphic trend element 168 may indicate one of a plurality of rate of change categories, in which each rate of change category is associated with a specific rate of change value or a range of rate of change values. As an example, the rate of change graphic trend element 168 of FIG. 6 indicates that the process variable is relatively quickly changing because of the two protruding marks. Referring now to FIG. 7, the fourth row of the chart 200 presents several examples of values, categories, etc. of this rate of change attribute as shown in different rate of change graph trend elements 220-224. For instance, a value of the rate of change graphic trend element 220 indicates that the rate of change of the process variable is stationary absolutely or relatively from the desired value 172. Alternatively, the graphic display application 30 may generate a value of the direction of change graphic trend element 222 to indicate that the rate of change of the process variable is slow, again, absolutely or relative to the desired value 172 or other rate of change values or other values of rate of change graphic trend elements 220, 224. As an additional example, the graphic display application 30 may implement a value of rate of change graphic trend element 224 to indicate that the rate of change of the process variable is quick relative to the other values of rate of change graphic trend elements 220, 222. When the value of rate of change is measured absolutely, a value of rate of change may be associated with a particular rate of change category via associating the value of rate of change with a particular range or using various thresholds to determine the change category.

Referring back to FIG. 6, the change desirability graphic trend element 170 may be depicted, for example, as displaying portions of the graphic trend symbol 160, such as the outline of the direction of change graphic trend element 166 and the rate of change graphic trend element 168, in bold with a thicker line. Of course, the graphic display application 30 may create the change desirability graphic trend element 170 using any other shapes, arrows, repetitive or flashing animations, graphical indications, or any other suitable manner of indicating the presence of the change desirability of a process variable. For example, the graphic display application 30 may retrieve a current and one or more historical values of the process variable associated with the graphic trend symbol from the database 12 and generate the direction change desirability graphic value element 170 based on the difference between the current raw value and at least one historical raw value. In particular, the graphic display application 30 may use the other graphic elements 162-168 in determining the change desirability graphic trend element 170. Of course, the graphical display application 30 may determine or generate the change desirability graphic trend element 170 in any suitable manner. The change desirability graphic trend element 170 may indicate one of a plurality of change desirability categories, in which each change desirability category is associated with an improving process variable state condition, a worsening process variable state condition, or a maintaining process variable state condition. As an example, the change desirability graphic trend element 170 of FIG. 6 indicates that the process variable state condition is worsening (e.g., portions of graphic trend symbol 160 are in bold) because process variable magnitude is increasing (i.e., the direction of change of the process variable is moving away from the desired value) while the process variable position is above the desired value 172.

As shown in FIG. 7, the fifth row of the chart 200 includes several examples of values, categories, etc. of this change desirability attribute as shown in different change desirability graph trend elements 226-230. In particular, the graphic display application 30 may implement a particular value of the change desirability attribute within a display graphic trend symbol to indicate to the operator whether the condition, the state, the trend, etc. of the process variable is improving, worsening, or maintaining. For instance, a value of the change desirability graphic trend element 226 indicates that the change desirability of the process variable is improving because the process variable is decreasing (i.e., the direction of change of the process variable is moving toward the desired value) and the position of the process variable is above the desired value 172. Alternatively, a value of the direction of change graphic trend element 228 indicates that the change desirability of the process variable is worsening because the process variable is increasing and the position of the process variable is above the desire value 172. An additional example includes a value of change desirability graphic trend element 230 that indicates that the change desirability of the process variable is maintained because the rate of change of the process variable is not increasing or decreasing regardless of the position of the process variable being above or below the desired value 172. After the graphic trend symbol 160 is generated, the graphic display application 30 may preferably display the graphic trend symbol 160 within the graphic depiction of the heater 112, as shown in FIG. 5, and on in the summary pane 130 as discussed above.

Figure 7A:
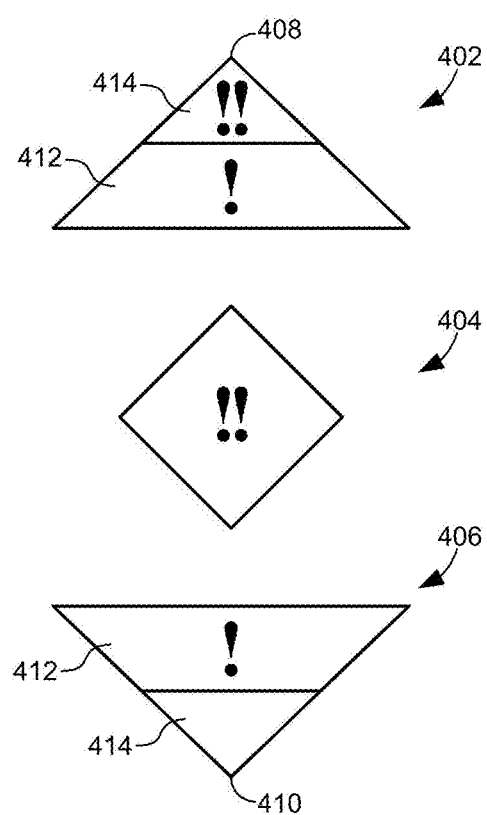
FIGS. 7A-D and 8-17 illustrate example icons to indicate conditions, characteristics, trends, and/or other information associated with process variables corresponding to components within the example process control system of FIG. 1.

As an alternative technique to the graphic trend symbol implementation of FIGS. 6 and 7, the graphic trend symbol be may implemented using various graphics to represent different states of a process variable as discussed below. For instance, FIG. 7A illustrates example icons 402, 404, 406 to indicate conditions, characteristics, trends, and/or other information associated with a process variable of a process control system (e.g., the example process control system 10 of FIG. 1.) Specifically, in the illustrated example of FIG. 7A, the characteristics and/or conditions emphasized by the icons 402, 404, 406 include a current state of a process variable, a projected state of the process variable, and a corresponding trend (e.g., direction) of the process variable, which are represented by the shape, orientation, and notations on the icons 402, 404, 406 in the illustrated example. For example, the icon 402 is triangular in shape with a peak 408 pointing upwards to visually indicate an upward trend of the process variable. By comparison, the icon 406 is also triangular in shape but with a peak 410 pointing downwards to visually indicate a downward trend of the process variable. The characteristic of the shapes of icons described herein to indicate a direction or trend of corresponding process variables is referred to herein as the trend identifying shape of the icons.

Additionally, the icons 402, 406 each contain two sections: (1) a current state section 412 that is opposite the peaks 408, 410 to visually indicate the current state of the process variable and (2) a projected state section 414 that is adjacent the peaks 408, 410 to visually indicate the projected state of the process variable. The icon 404 of FIG. 7A is in a generally diamond or rhombus shape (or any other suitable shape) to be distinguishable from the triangular shapes of the icons 402, 406 to visually indicate that the process variable is maintaining its present state (e.g., there is no trend upwards or downwards). The current state sections 412 and the projected state sections 414 of the icons 402, 404 are positioned in a stacked manner corresponding to the direction the process variable is trending (e.g., the direction the peaks 408, 410 are pointing). As used herein, the term "state" of a process variable corresponds to the operating state of the variable with respect to its set point and/or any alarm limits. For example, if a process variable is operating within allowable limits, the "state" of the process variable would be normal or as expected or as desired. However, if the process variable has exceeded a high alarm limit, then the state of the process variable would be a high alarm state. Similarly, the state of an alarm may be a low alarm state if the process variable drops below a corresponding low alarm limit. In some situations, a process variable may be associated with multiple alarm limits set at different values corresponding to varying levels of seriousness or criticality (e.g., a high alarm limit and a high-high alarm limit).

In the illustrated example, the current and projected states of a process variable are visually indicated in the icons 402, 404, 406 by a textual notation or other visual indicia within the corresponding current state and projected state sections 412, 414. For example, as shown in FIG. 7A, a single exclamation point is indicative of the process variable in an operating state (e.g., the current state section 412 in the icon 402) corresponding to a first alarm state associated with a range of values for the process variable outside normal operating conditions (e.g., the process variable drops below a low alarm limit or rises above a high alarm limit) A double exclamation point is indicative of the process variable passing a second alarm limit (e.g., the process variable drops below a low-low alarm limit or rises above a high-high alarm limit) into a corresponding low-low alarm state or a high-high alarm state (e.g., the projected state section 414 in the icon 402). Additional exclamation points and/or other notations may be provided to indicate other operating states associated with the process variable (e.g., passing a third alarm limit) No exclamation point shown (e.g., the projected state section 414 of the icon 406) is indicative of the process variable operating within normal operating conditions.

The icon 404 of the illustrated example is not divided into sections because the icon 404 indicates that the corresponding process variable is being maintained in a specific state (e.g., it is not trending upwards or downwards to change states). Put another way, the current state and the projected state of the process variable are the same. Accordingly, only a single notation (e.g., a single set of double exclamation points) is represented within the icon 404 to indicate the corresponding state within which the process variable is being maintained (e.g., it is remaining steady in a high-high alarm state).

Visually representing the current state, the projected state, and the associated trend as described above enables an operator to quickly and intuitively assess conditions associated with a process variable including the current state of the process variable as well as a projected state. In this manner, an operator can anticipate when a process variable is approaching an alarm limit to proactively take measures to resolve the situation even before the alarm is tripped. Furthermore, even if the process variable is operating within an alarm state outside a desired range of values, visually indicating current and projected state characteristics associated with the process variable enables the operator to quickly recognize the qualitative status of the trend (e.g., whether the state of the process variable is improving (moving towards the set point) or worsening (moving away from the set point)). In a similar manner, where a process variable is bounded by alarm limits on a single side (e.g., either high limits or low limits), the current and projected states can serve to identify the direction or trend in which the value of the process variable is moving. However, where a process variable is bounded on both sides (e.g., has both upper and lower alarm limits) the trend of the process variable may not be immediately apparent based only on the current and projected states. Accordingly, the icons 402, 406 of FIG. 7A are shaped like triangles to point in the direction in which the process variable is trending as is shown and described in greater detail in FIG. 7B.

Figure 7B:
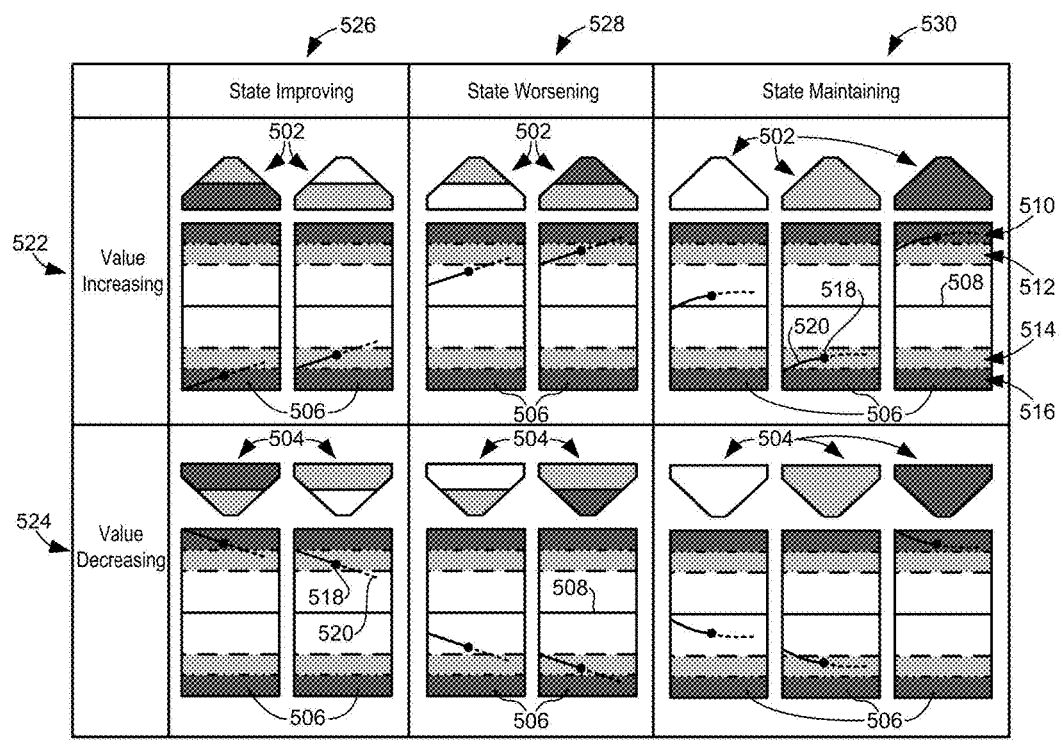
Figure 7C:
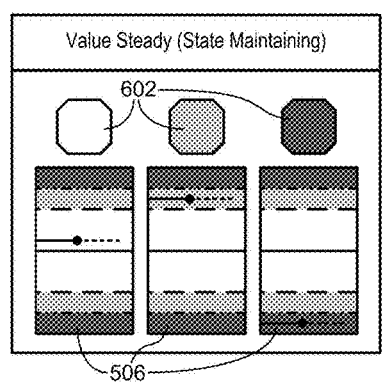
Figure 7D:
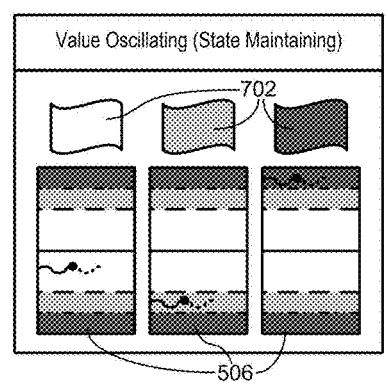

FIGS. 7B-7D illustrate other example icons 502, 504, 602, 702 to indicate the conditions, characteristics, trends, and/or information associated with a process variable as described above in connection with FIG. 7A. Specifically, the example icons of FIGS. 7B-7D emphasize current and projected states of a process variable, and the direction of the process variable. The example icons 502 of FIG. 7B are similar to the icon 402 of FIG. 7A in that the icons 502 are generally triangular in shape and point upward to indicate an upward trend of the process variable. The example icons 504 of FIG. 7B are also similar to the icon 406 of FIG. 7A in that the icons 504 are generally triangular in shape and point downward to indicate a downward trend of the process variable. Furthermore, while the icons 402, 406 of FIG. 7A include exclamation points to indicate the current and projected state of the corresponding process variables, the current and projected states in the icons 502, 504 are represented by the shading (e.g., flood fill) of the corresponding current and projected state sections. Other methods of indicating the operating states of the process variables may alternatively be used including different patterns, colors, shading, shapes, sizes, outlines, textual or symbolic notations, flashing, highlighting, etc. For example, a normal operating state may be indicated by a gray color, a low or high alarm state (relatively low criticality) may be indicated by a yellow color, and a low-low or a high-high alarm state (relatively high criticality) may be indicated by a red color. Further, in such examples, the background or surrounding color may be indicated by a gainsboro color (e.g., a light bluish gray). More generally, the color scheme implemented in some examples is specified in industry standard perceptual color discrimination spaces (e.g., International Commission on Illumination (CIE) standards). An advantage of such a color scheme is that the colors may be distinguishable by color anomalous (e.g., color blind) as well as normal (e.g., non-color anomalous) operators. In the illustrated examples of FIG. 7B and throughout the following figures, the high criticality states (e.g., low-low or high-high alarm states) are represented with dark shading, the low criticality states (e.g., low or high alarm states) are represented with light shading, and the normal operating state is represented with no shading (e.g., white.)

For purposes of explanation, the icons 502, 504 are shown above corresponding process variable graphs 506 that indicate an example value of the process variable over time. Each graph 506 shows a set point or target value (indicated by the centerline 508) at which the process variable is to operate under normal conditions and two levels of high and low alarm states or ranges (referred to herein as a high-high alarm state 510, a high alarm state 512, a low alarm state 514, and a low-low alarm state 516) delineated by hashed lines corresponding to alarm limits and distinguished with different shading associated with the severity of the corresponding alarm state. The state of a process variable within the area between the high and low alarm states 512, 514 is referred to herein as the normal or target operating state. Additionally, each graph includes a dot 518 representative of the current value of the process variable disposed along a line 520. The solid portion of the line 520 is representative of the value of the process variable over time leading up to the current value. The dotted portion of the line 520 is an extrapolation of the solid portion of the line 520 to represent the projected value of the process variable going forward in time. Additionally or alternatively, other icons (or variations on the icons 502, 504 shown in FIG. 7B) may be used to represent corresponding process variables changing in other manner over time not shown by the graphs 506 (e.g., a steeper trend line 520 that crosses over the set point.)

As shown in FIG. 7B, the icons 502 are placed in a row 522 associated with an increasing process variable (e.g., trending upwards) and the icons 504 are placed in a row 524 associated with a decreasing process variable (e.g., trending downwards). Based on the trend identifying shape of the icons 502, 504 (e.g., a generally triangular shape oriented to point up or down), an operator can easily identify the direction or trend of the process variable. Furthermore, in some such examples, based on the direction of the trend in conjunction with the ordering of the states indicated by the current and projected state sections, operators can infer the relative position of the process variable with respect to the desired value (e.g., set point, etc.) and the qualitative status of the indicated trend (e.g., worsening or improving). For example, if the trend identifying shape indicates a downward trend and the projected state section indicates a worse alarm state than the current state section, operators can infer that the process variable is below the set point and dropping (i.e., getting worse). In contrast, if the trend identifying shape indicates an upward trend with the same current and projected states as in the above example, operators can infer that the process variable is above the target value and rising such that it is again worsening. In a similar manner, if the relative severity of the current and projected state sections of the icons are reversed from the above examples, operators can infer whether a process variable is above or below the set point and that it is qualitatively improving (i.e., moving towards the set point.)

In the illustrated example of FIG. 7B, the icons 502, 504 are grouped in separate columns 526, 528, 530 based on whether the state of the process variable is improving in that it is moving towards the desired value (e.g., the set point) (column 526), worsening in that it is moving away from the set point (column 528), or maintaining in that it is in a substantially constant or steady state condition (column 530). Within the improving column 526 and the worsening column 528 of the increasing row 522, FIG. 7B provides each possible icon 502 for each projected transition between states as the value of the process variable is projected to move from the low-low alarm region to the low alarm region, from the low alarm region to the normal operating state, from the normal operating state to the high alarm region, and from the high alarm region to the high-high alarm region. In the columns 526, 528 of the decreasing row 524, FIG. 7B illustrates each icon 504 corresponding to the reverse transitions from the high-high alarm range down through the low-low alarm range. As with the icons 402, 406 of FIG. 7A, the current and projected state of the process variable associated with the icons 502, 504 of FIG. 7B are based on the visually distinguishable characteristic (e.g., shading or flood fill, patterns, colors, shapes, sizes, outlines, textual or symbolic notations, bordering, flashing, highlighting, etc.) of the current and projected state sections of the icons 502, 504.

Within the state maintaining column 530, the icons 502, 504 have the same generally triangular shape as the icons 502, 504 of the other columns 526, 528 (to indicate a direction of the trend associated with the process variable). However, in contrast with the icons 502, 504 in the columns 526, 528, the icons 502, 504 of the state maintaining column 530 are filled or shaded with a single color corresponding to a single state of the process variable. In this manner, an operator may recognize that while the process variable is either moving up (icons 502) or down (icons 504), the trend is evening out such that the projected state is the same as the current state. In some situations, the process variable may be substantially constant over time such that there is no trend up or down. Under such conditions, a different shape may be represented such as a generally octagonal shape as shown by the icons 602 of FIG. 7C with appropriate indicia (e.g., shading, patterns, colors, outlines, textual or symbolic notations, bordering, flashing, highlighting, etc.) to visually indicate the corresponding operating state of the process variable. The generally octagonal shape is provided because of its association with a stop sign to intuitively indicate the process variable is not changing (i.e., it has stopped). Additionally or alternatively, where the trend is oscillating or the trend is not otherwise clearly moving up, down, or maintaining a steady state, a different shape may be used to indicate such a condition of the process variable as shown by the shape of the icons 702 of FIG. 7D. While certain shapes have been described in connection with FIGS. 7A-7D to indicate various characteristics (e.g., current state, projected state, trend) other suitable shapes and their corresponding orientation may alternatively be used. For examples, an arrow or other shape that indicates direction may be used in place of the icons 402, 406 of FIG. 7A and the icons 502, 504 of FIG. 7B.

Figure 8:
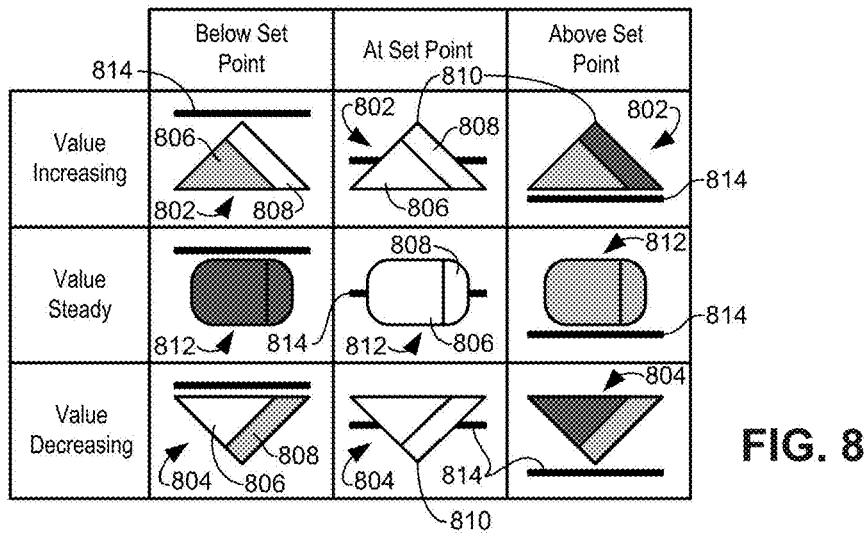
Figure 9:
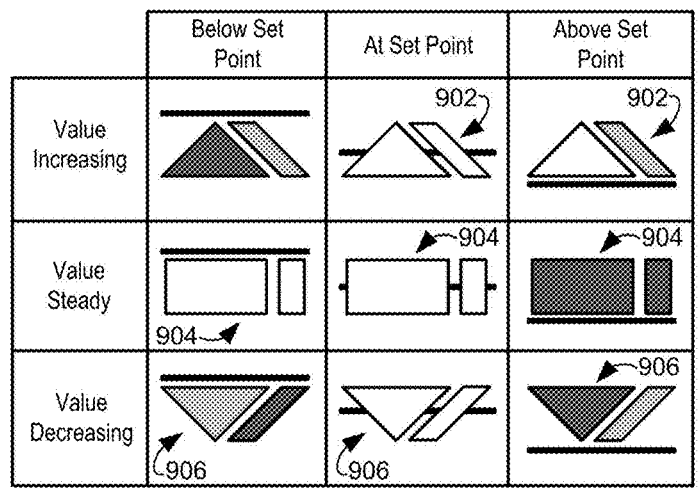
Figure 10:
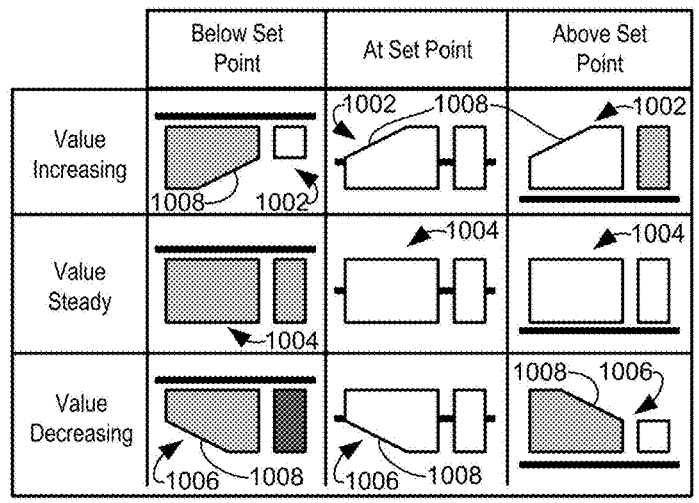

As additional alternative examples, FIGS. 8-10 illustrate other example icons to indicate conditions, characteristics, trends, and/or other information associated with the process variable of the example process control system 10 of FIG. 1. In particular, the illustrated examples of FIGS. 8-10 show icons that emphasize current and projected states of a process variable, the direction of the process variable, and the relationship of the process variable to a set point associated with the process variable. For instance, FIG. 8 illustrates example triangular icons 802, 804 similar to the triangular icons 402, 406 of FIG. 7A except that the icons 802, 804 are divided into a current state section 806 and a projected state section 808 where the projected state section 808 extends along an edge adjacent a peak 810 of the triangular icons 802, 804. In this manner, the horizontal relationship of the sections 806, 808 (e.g., viewed from left to right) represents the change of state of the process variable over time. That is, the current state is indicated on the left (by the current state section 806) and the projected state (i.e., the state at a future point in time) is indicated on the right (by the projected state section 808). Additionally, the vertical relationship of the sections 806, 808 (e.g., viewed up or down in the direction pointed by the peak 810) represents the direction of the process variable. FIG. 8 also illustrates example steady state icons 812 having a generally rectangular shape. The steady state icons 812 also include two sections to provide consistency with the increasing and decreasing trend icons 802, 802 but each section 806, 808 has the same visual indicia of the operating state (e.g., shading, pattern, color, outline, textual or symbolic notation, bordering, flashing, highlighting, etc.) because a steady state implies that the projected state of an associated process variable is the same as the current state of the process variable. Accordingly, the example icons 802, 804, 812 of FIG. 8 provide the same information regarding the current and projected states of a process variable as well as the trend of the process variable as was described above in connection with FIGS. 7A-7D.

Additionally, the example icons 802, 804, 812 include a set point indicator 814 (e.g., a line denoting a desired value) to indicate the relative position of the value of the process variable with respect to a set point associated with the process variable. For example, in the left hand column of FIG. 8 the set point indicator 814 in each of the corresponding icons 802, 804, 812 is positioned above the rest of the corresponding icon 802, 804, 812 (e.g., above the sections 806, 808) to indicate the process variable is below the set point. In this manner, an operator can recognize that the process variable represented by the increasing icon 802 is improving (i.e., moving towards the set point) while the process variable represented by the decreasing icon 804 is worsening (i.e., moving away from the set point) without having to mentally integrate the meaning of the shading in the current state section 806 and the projected state section 808 and the order in which the sections 806, 808 are stacked. Thus, whether a process variable is getting farther away or closer to its set point can be identified even if the current state and the projected state are the same. In a similar manner, as shown in FIG. 8, the set point indicator 814 is placed below the rest of the icons 802, 804, 812 to indicate the value of the process variable is above the set point, and the set point is positioned at the same level as the rest of the icons 802, 804, 812 to indicate when the value of the process variable is approximately at the set point. While FIG. 8 shows the set point indicator 814 behind the rest of the icons 802, 804, 810, in some examples, the set point indicator 814 is placed in front of (i.e., overlays) the rest of the icons 802, 804, 810.

As an another example, FIG. 9 illustrates icons 902, 904, 906 that function in the same way as the icons 802, 804, 810 of FIG. 8, except that the icons 902, 904, 906 have a different shape. In particular, the trend identifying shape (e.g., triangular shape) of the icons 902, 904, 906 to indicate the trend or direction of the process variable is exclusively associated with the current state of the process variable, while a separate section running along a side of the triangle serves to indicate the projected state of the process variable.

FIG. 10 illustrates yet other example icons 1002, 1004, 1006 similar to those described above in connection with FIGS. 8 and 9. In FIG. 10, the current state of the process variable is indicated by a generally rectangular shape with a chamfered-like edge 1008. In the illustrated example, the slope of the edge 1008 (moving from left to right) serves to indicate the direction of trend of the process variable over time. The icons 1004 of the illustrated example do not have a chamfered-like edge 1008, thereby indicating that the process variable is maintaining its current value. In some examples, the angle of the slope is indicative of the rate at which the value of the process variable is changing. The use of the edge 1008 provides an alternative trend identifying shape that does not point the direction of the trend like a triangle or arrow but is nevertheless intuitive because it is representative of a graph plotted over time.

While the example icons 802, 804, 810, 902, 904, 906, 1002, 1004, 1006 of FIGS. 8-10 provide some indication of the relative position of the process variable with respect to the set point (e.g., via the set point indicator 814 of FIG. 8), in some examples, in addition to the relative position of the process variable (i.e., above, below, or at the set point), it is desirable to indicate the relative deviation of the process variable from the set point with respect to an entire range of potential values for the process variable (e.g., how far above or below the set point). An indication of such a relative deviation of the process variable from the set point is provided in the illustrated examples of FIGS. 11-17 along with other indications of conditions, characteristics, trends, and/or other information associated with process variables described more fully below.

Figure 11:
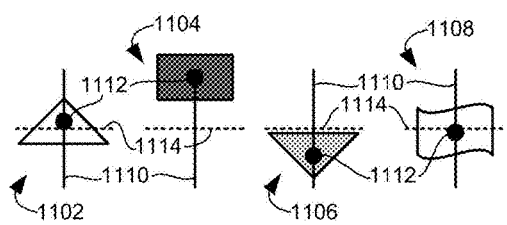

In particular, FIG. 11 illustrates example icons 1102, 1104, 1106, 1108 with shapes similar to those described above. For example, the triangles in icons 1102, 1106 indicate that the trend of the process variable is moving up or down, respectively. The rectangle in the icon 1104 indicates a steady state of the process variable, and the wavy rectangle in the icon 1108 indicates an oscillating or indeterminate pattern of the process variable. Further, the shading of each shape indicates the corresponding operational state (e.g., normal operating state, high alarm state, low alarm state, high-high alarm state, low-low alarm state, etc.) of the process variable as described above.

As shown in FIG. 11, each of the shapes is positioned at various points along an operational range indicator 1110 (e.g., the solid vertical line). In the illustrated example, the range indicator 1110 is representative of a range of potential values at which the process variable may operate and a process variable indicator 1112 (e.g., the central dot of each icon 1102, 1104, 1106, 1108) corresponds to the location or position of the process variable within the range represented by the line 1110. Thus, as is shown in the icon 1104, the process variable is nearly at the upper extremity of the range of potential values and, therefore, is shown with a pattern corresponding to a high-high alarm state. The dashed horizontal line in each icon 1102, 1104, 1106, 1108 is a set point indicator 1114 (e.g., a dashed line) representative of the set point relative to the range of potential values indicated by the range indicator 1110. Although the set point indicator 1114 is shown in FIG. 11 as approximately in the middle of the range indicator 1110, the set point indicator 1114 may be located at any location along the range indicator 1110 depending upon the value of the set point and the corresponding values associated with the range defined by the range indicator 1110. In this manner, an operator may immediately determine the relative position (e.g., above/below) of the process variable with respect to the set point as in FIGS. 8-9 but also visually assess the relative deviation of the process variable from the set point with respect to the extreme values of the process variable within an expected range of values for the process variable represented by the line 1110 to obtain a more accurate picture of the condition of the process variable.

Figure 12:
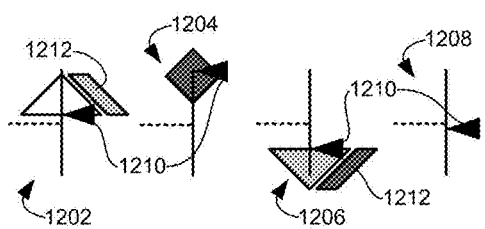

FIG. 12 illustrates example icons 1202, 1204, 1206, 1208 that correspond to the same states and corresponding trends as illustrated in the example icons 1102, 1104, 1106, 1108 of FIG. 11, respectively. However, the example icons 1202, 1204, 1206, 1208 include a process variable indicator 1210 that is an arrow head or pointer, instead of the dot 1112 of FIG. 11, to point the specific location of the process variable relative to the set point and the entire range of potential values for the process variable. Additionally, the example icons 1202, 1206 include a projected state section 1212 to explicitly indicate in a visual manner, the direction of the trend and the anticipated state of the process variable if the trend continues on its projected path without change.

Figure 13:
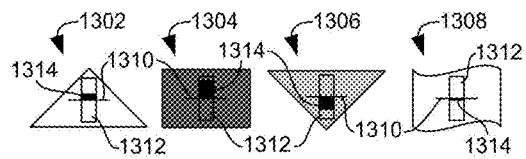

FIG. 13 illustrates other example icons 1302, 1304, 1306, 1308 that correspond to the same states and corresponding trends as illustrated in connection with the example icons 1102, 1104, 1106, 1108 of FIG. 11, respectively. Furthermore, as shown in the illustrated example, the icons 1302, 1304, 1306, 1308 of FIG. 13 are based on the same shapes as the example icons 1102, 1104, 1106, 1108 of FIG. 11. However, in the example icons 1302, 1304, 1306, 1308 of FIG. 13, a set point indicator 1310 (e.g., the central line) and an operational range indicator 1312 (e.g., the rectangular bar) are shown within the outer shape. The relative position and relative deviation of the process variable with respect to the set point and outer limits of potential values for the process variable is indicated by a black band that serves as a process variable indicator 1314 within the range bar 1312. In this manner, the icons 1302, 1304, 1306, 1308 remain stationary and can be larger and of a consistent size when used in an operator display as compared to the examples of FIGS. 11 and 12.

Figure 14:
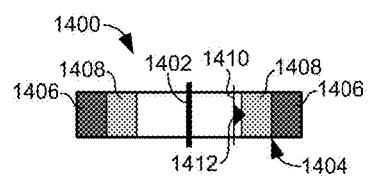

In addition to indicating the placement of a process variable within an overall range of potential values and relative to a set point, in some examples disclosed herein, the placement or relative distance of the value of the process variable with respect to one or more alarm limits may also be indicated (as shown in the illustrated examples of FIGS. 14-16 described in greater detail below). For example, FIG. 14 illustrates another example icon 1400 with a set point indicator 1402 (e.g., the central bar or line) located on an operational range indicator bar 1404. In the illustrated example, each end of the range indicator 1404 includes an outer (more critical) alarm section 1406 corresponding to a sub-range of values associated with a high-high alarm state or a low-low alarm state. Immediately within the outer alarm sections 1406 of the example icon 1400 is an inner alarm section 1408 corresponding to a high alarm state or a low alarm state while the remaining portion of the range indicator bar 1404 corresponds to a normal operating state. The relative position, deviation, and distance of the process variable with respect to the set point, alarm limits, and entire operational range (as well as the current state of the process variable) is indicated in the example icon 1400 by a process variable indicator line 1410 that may move along the range bar 1404. The trend or direction of the process variable and, therefore, the projected state of the process variable, is indicated by the direction in which an arrow marker 1412 is pointing along the range 1406.

Figure 15:
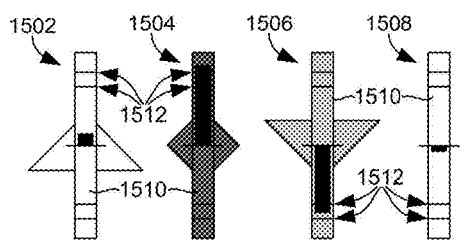

FIG. 15 illustrates other example icons 1502, 1504, 1506, 1508 having operational range indicator bars 1510 similar to the range indicator bars 1312 of the example icons 1302, 1304, 1306, 1308 of FIG. 13 except that the range indicator bars 1510 of FIG. 15 are substantially longer and extend beyond the trend identifying shapes associated with each of the example icons 1502, 1504, 1506, 1508. The longer range indicator 1510 provides a greater distance over which the range of potential process variable values is represented to provide greater precision or granularity in visually indicating the relative position, deviation, and/or distance of the process variable with respect to the set point, range, and/or alarm limits. Furthermore, as shown in the illustrated example, additional alarm limit indicators 1512 (e.g., lines) are included within the range indicator bar 1510 to represent the points on the range corresponding to alarm limits for the process variable (e.g., similar to the alarm sections 1406, 1408 of FIG. 14 described above.)

Figure 16:
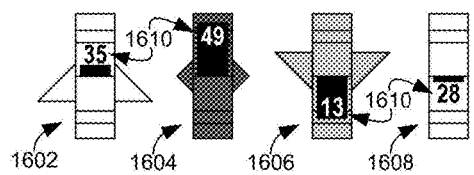

FIG. 16 illustrates other example icons 1602, 1604, 1606, 1608 that are similar to the example icons 1502, 1504, 1506, 1508 of FIG. 15 except that the icons 1602, 1604, 1606, 1608 include a textual notation 1610 identifying the actual value of the process variable. In other examples, the actual value of the set point and/or the alarm limits may also be indicated.

Figure 17:
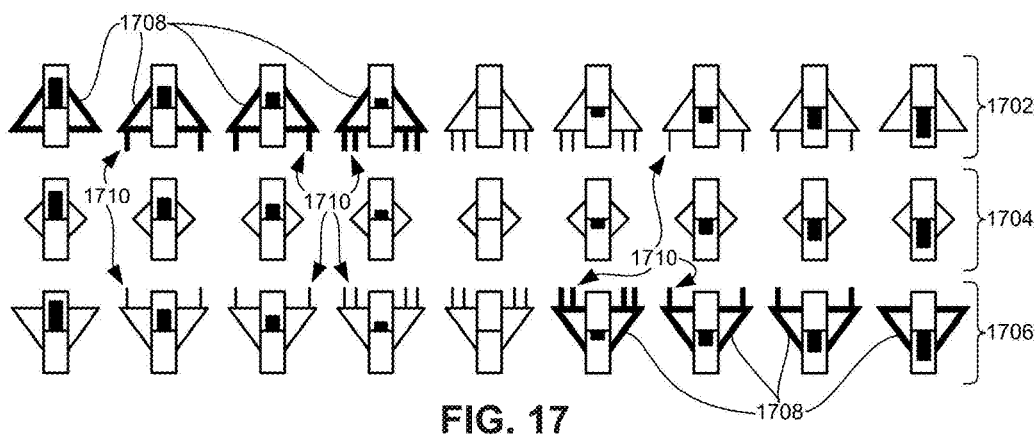

FIG. 17 illustrates a series of example icons 1702, 1704, 1706 similar to those of FIGS. 15 and 16 corresponding to a process variable at various locations along a range defined by a range indicator. For simplicity, different shading (e.g., flood fill) in the icons 1702, 1704, 1706 has been omitted but, in some examples, when being used would be shaded (or flood filled) in a similar manner as described above. In the four left-most increasing icons 1702, the process variable is shown above the set point (based on the position of the process variable indicator (e.g., the black band)) and the trend identifying shape of the icons 1702 is an upward pointing triangle. As a result, in the illustrated example, the four left-most icons 1702 are indicative of a worsening state (e.g., the process variable is trending away from the set point). This is similarly true for the four-right-most decreasing icons 1706. As shown in the illustrated example, the trend identifying shape (e.g., a generally triangular shape pointing up or down) associated with the icons 1702, 1706 in a qualitatively worsening state are represented with a thick border 1708 to capture the attention of an operator and/or enable the operator to quickly identify when a process parameter is worsening and, thus, may need corrective action. In other examples, the icons 1702, 1704 associated with a worsening state may be distinguished in any other suitable manner such as flashing, changing in color, size, intensity, pattern, orientation, etc.

Another characteristic associated with a process variable that can be beneficial to an operator is the rate or speed at which a process variable is changing. For example, if a process variable is rapidly approaching an alarm limit, an operator can benefit from this knowledge to know that action must be taken quickly to avert potential problems whereas if a process variable is trending towards an alarm limit, but at a modest pace, the operator may monitor the process variable to determine if it is corrected before taking action. Accordingly, in the illustrated example of FIG. 17, the rate of change of the value of a process variable is indicated by rate indicators 1710 (e.g., the lines or tails stemming from the trend identifying shape). In some examples, a greater number of rate indicators 1710 corresponds to a greater rate of change of the process variable. As is illustrated, the rate indicators 1710 may also be displayed as thick lines when the corresponding process variable is in a worsening state.

While the example icons describe above in connection with FIGS. 6-17 provide various visual indicia (e.g., shading, patterns, colors, shapes, sizes, lines, pointers, outlines, orientations, symbols, notations, bordering, flashing, highlighting, etc.) to convey the identified characteristics, trends, and/or conditions of corresponding process variables, other visual indicia and their appropriate orientation and composition may be used in addition to, or in place of, what is described above to convey the same characteristics and/or conditions. Furthermore, the visual indicia of the icons described above may be combined in different ways and/or be given different meanings from what is described herein to convey the desired information and enable the salient attributes to stand out to operators in an intuitive manner with relatively little mental effort and/or time on the part of the operators. The intent of the visual indicia of the example icons described herein increase the efficiency of operators while reducing the potential for errors. Additionally, the different icons and corresponding visual indicia described above in connection with FIGS. 6-17 tradeoff in terms of the attributes of the process variables and/or the aspects of the corresponding trend information that are emphasized to an operator. Accordingly, the particular icons used in any particular process control system setting can vary based on the needs and/or circumstances of the particular operations being monitored and controlled and/or the preferences of the operators associated with the particular process control system. In some examples, to further assist operators in quickly identifying circumstances and/or process attributes of particular interest and/or concern, the icons rendered in a relatively sparse layout and arranged (e.g., horizontally aligned, vertically aligned, etc.) in a manner that draws the attention of the operators to the salient issues. For example, an icon indicating a single decreasing parameter among a number of other icons indicating parameters that are non-decreasing may pop-out or attract the attention of an operator for easy spotting. Some such example arrangements of the icons are described in greater detail below.

Figure 18:
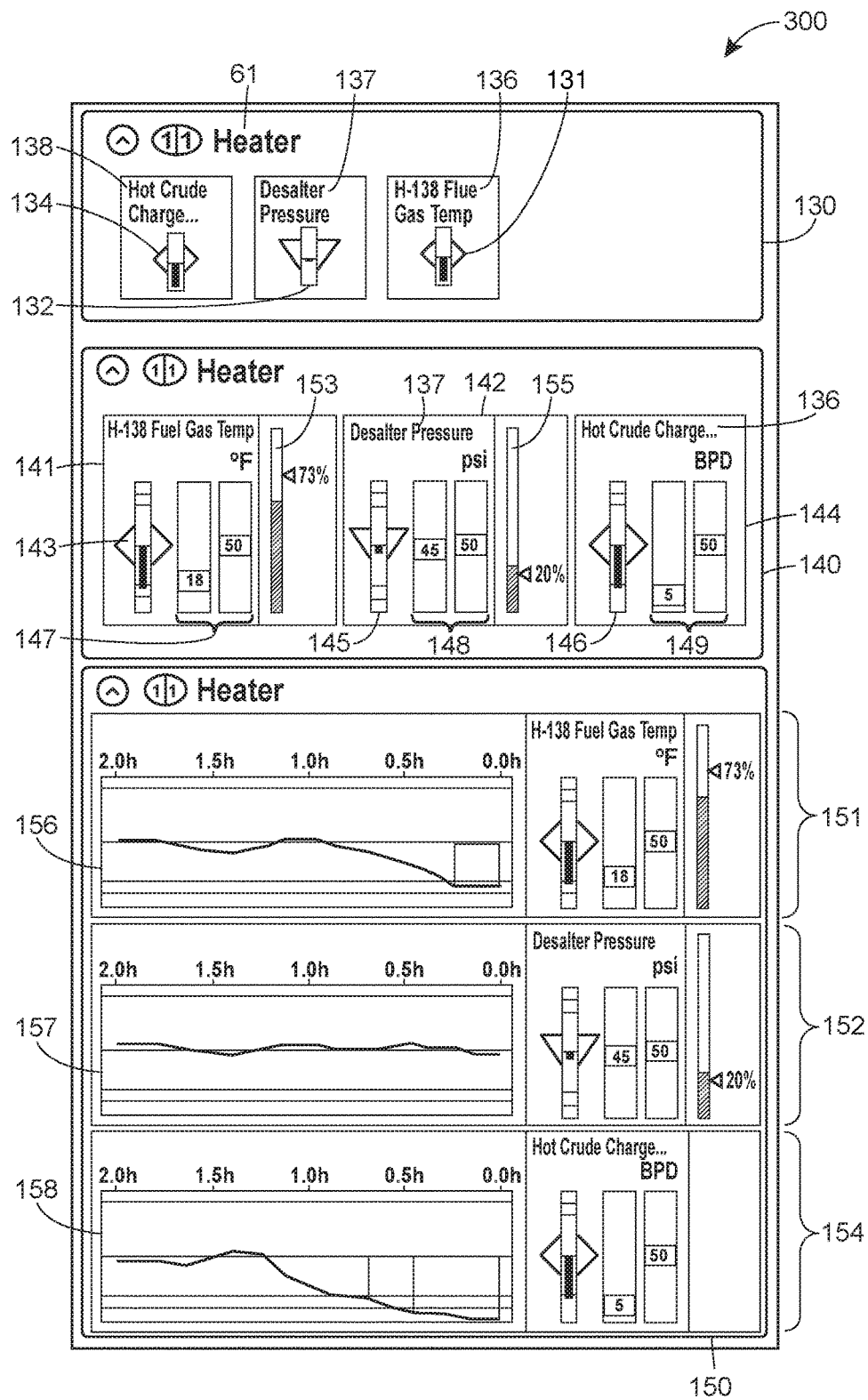
FIG. 18 is detailed view of a summary pane, a detailed pane, and an expanded pane of the screen shot of FIG. 5.

In conjunction with displaying the graphic trend symbol within the graphical representation, the graphic display application 30 may determine to implement one or more process variable information panes of varied levels of detail depending various factors, such as screen space, process variables in a critical state, etc. The graphic display application implements each pane to display a different level of detailed information for the one or more process variables that correspond to the displayed graphic trend symbols within the currently displayed view of the graphical representation. Referring now to FIG. 18, the graphic display application 30 may display one or more of the summary pane 130, the detailed pane 140, and the expanded pane 150, as shown in a detailed view 300 of the screen shot 110 of FIG. 5, in conjunction with the graphic depiction of the heater 112 of FIG. 5 as discussed above. Advantageously, the graphic display application 30 displays the same process variable on each pane 130, 140, 150 with increasingly more detail for each pane 130, 140, 150. For example, the detailed pane 140 includes and display more detailed process information for the process variable than the summary pane 130. Likewise, the expanded pane 150 includes and display more detailed process information for the process variable than the detailed pane 140.

With continued reference to FIG. 18, the summary pane 130 may include one or more graphic trend symbols 131-134 and a process variable title 136-138 corresponding to each graphic trend symbol 131-134. The detailed pane 140 includes detailed views of each process variable 141, 142, 144 in which each detailed view of a particular process variable includes a larger, higher resolution version of the graphic trend symbol 143, 145, 146, a current process variable magnitude/position value and desired value comparison diagrams 147-149, and an actual actuator or value position 153, 155. The expanded pane 150 includes expanded views of each process variable 151, 152, 154 in which each expanded view of a particular process variable includes the information from the detailed view 141, 142, 144 and a historical trend graph 156-158. For simplicity, the process variable graphics and corresponding process variables attributes associated with the summary pane 130, detailed pane 140, and expanded pane 150 may be referred to herewithin as "basic graphics," "mid-level graphics," and "detailed graphics." For example, the graphic trend symbol 143 and corresponding attributes (e.g., diagram 147, value position 153, etc.) associated with the process variable 141 would be referred to as mid-level graphics because the process variable 141 appears in the detailed pane 140.

Because each pane 130, 140, 150 may be revealed or hidden, the graphic display application 30 may determine to display the appropriate level of detail depending on the usage of the operator. For example, the graphic display application 30 may display full detail of all of the process variables when necessary. However, because of screen space constraints, the graphic display application 30 may have to provide a scroll bar that does not allow all of the possible information to be seen by the operator at once. In this case, the graphic display application 30 may hide the summary pane 130 and detailed pane 140 to create more screen space for the expanded pane 150. Alternatively, the graphic display application 30 may determine that all process variables should be visible and may shrink or hide the expanded views of some or all of the process variables 151, 152, 154 or some or all of the detailed views of the process variables 141, 142, 144. In another implementation, the graphic display application 30 may determine to display all information for critical process variables or critical details within the graphical representation of the heater 112, for example. In this case, the graphic display application 30 may hide the views for less critical process variables or less critical details.

Figure 18A:
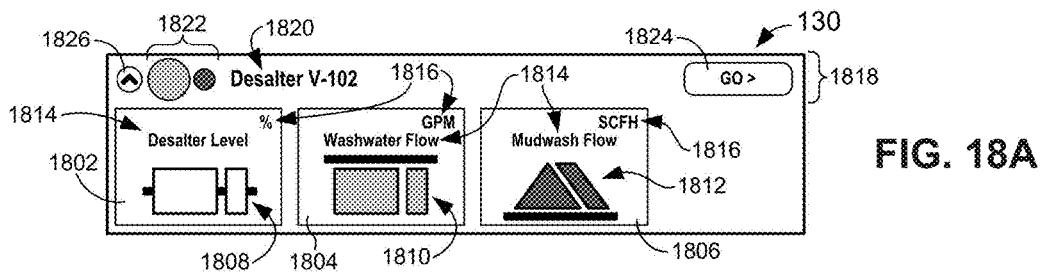
FIG. 18A illustrates an alternative example of the summary pane of FIG. 18.
Figure 18B:
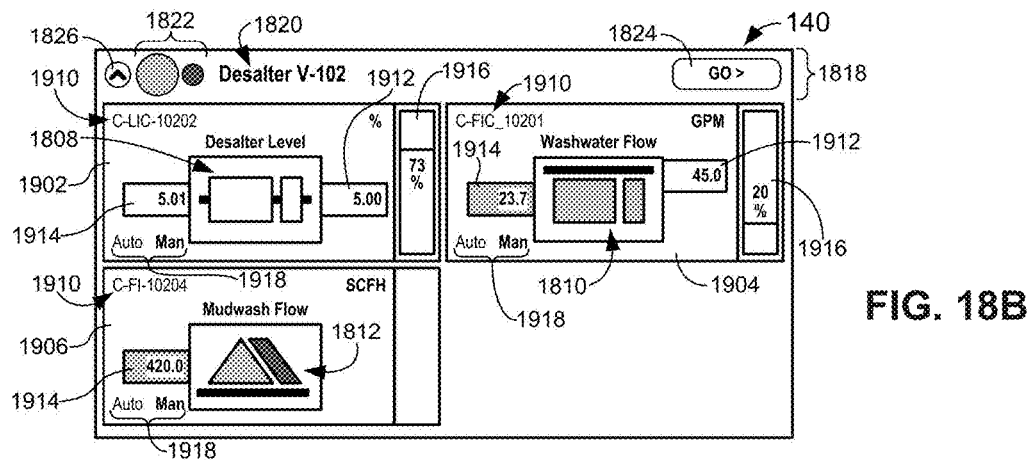
FIG. 18B illustrates an alternative example of the detailed pane of FIG. 18 containing example process variable graphics to indicate more information than the example graphics of FIG. 18A.
Figure 18C:
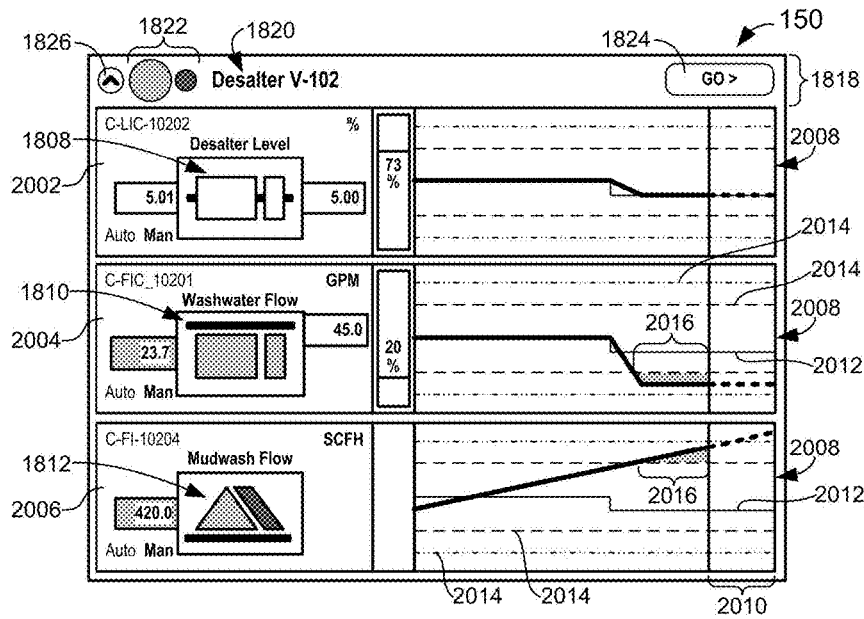
FIG. 18C illustrates an alternative example of the process variable pane of FIG. 18 containing example process variable graphics to indicate more information than the example graphics of FIG. 18B.
Figure 18D:
FIG. 18D illustrates the example process variable summary pane of FIGS. 18A-18C in a collapsed form.

In the alternative, FIGS. 18A-18D illustrate an example process variable summary pane 1800 that includes example graphics associated with three process variables of a desalter module of a process control system (e.g., the example process control system 10 of FIG. 1.) The graphics may correspond to the graphics described above in connection with FIG. 18. The graphics in each of the FIGS. 18A-18D include varying levels of detail to provide varying amounts of information relating to the process variables based on the needs and/or desires of an operator. More particularly, FIG. 18A illustrates another example process variable summary pane 130 containing example graphic trend symbols 1802, 1804, 1806. FIG. 18B illustrates the example process variable detailed pane 140 including example graphic trend symbols 1902, 1904, 1906 with additional process variable attribute information. FIG. 18C illustrates the example process variable expanded pane 150 including example graphic trend symbols 2002, 2004, 2006 and further detailed process variable attributes. FIG. 18D illustrates the summary pane 1800 in a collapsed form with the graphics hidden from view.

As shown in the illustrated examples, each of the basic graphics 1802, 1804, 1806, mid-level graphics 1902, 1904, 1906, and detailed graphics 2002, 2004, 2006 include the same icons 1808, 1810, 1812, respectively, which are similar to the icons described above in connection with FIG. 18. Additionally, the basic graphics 1802, 1804, 1806 in the illustrated example of FIG. 18A include summary information such as a name 1814 of the process variable or parameter being measured and a corresponding units of measurement 1816. In some examples, the basic graphics 1802, 1804, 1806 may be limited to the icons without any additional information.

As another alternative example to FIG. 18, the mid-level graphics 1902, 1904, 1906 of FIG. 18B include the same summary information provided in the basic graphics 1808, 1810, 1812 but also add additional details. For example, the mid-level graphics 1902, 1904, 1906 of the illustrated example include a parameter code or tag 1910 associated with the process variable, a set point or target value indicator 1912 for the corresponding process variable, a measured value indicator 1914 of the corresponding process variable, an output indicator 1916 associated with the corresponding process variable if appropriate (e.g., output of a control valve), and a mode indicator 1918 to indicate whether the process is under automatic or manual control. As shown in the example illustration, the measured value indicator 1914 is positioned at the same level as the trend indicator of the corresponding icon 1808, 1810, 1812 while the set point value indicator 1912 is positioned at a level corresponding to each respective set point indicator to provide a second visual indication of whether the value of the process variable is above, below, or approximately the same as the set point. Furthermore, the measured value indicator 1914 is filled with the same shading as the current state section of the corresponding icon 1808, 1810, 1812 to indicate the current state of the process variable.

As an alternative and similar implementation to FIG. 18, the detailed graphics 2002, 2004, 2006 of FIG. 18C include the same information provided in the mid-level graphics 1902, 1904, 1906 of FIG. 18B but also add additional details. For example, the detailed graphics 2002, 2004, 2006 may include a trend graph 2008 that plots the value of the process variable over a certain time period. In some examples, the trend graph 2008 includes a projected trend region 2010 to visually represent an expected path of the process variable if it continues on its current trend. As shown in the example trend graphs 2008 of FIG. 18C, a set point line 2012 and one or more alarm lines 2014 are included to visually indicate the relative position of the process variable with respect to the set point and alarm limits over the time period displayed in the graph 2008. Additionally, in some examples, the trend graphs 2008 may identify alarm state portions 2016 (e.g., via different shading, patterns, colors, or other visually distinguishable indicia) that enable the timing, duration, and state of alarms associated with the process variable to be tracked or tagged over time.

A top banner 1818, of the example process variable panes 130, 140, 150, and 1800 of FIGS. 18A-18D provides a title and/or code 1820 associated with the plant, area, unit, module or other component of a process control system corresponding to the summary pane 1800. The top banner 1818 may also include a summary icon 1822 that provides summary data associated the process variables associated with the component of the process control system corresponding to the process variable summary pane 1800. For instance, in the illustrated example, the summary icon 1822 indicates the worst current state (e.g., by the shading or other graphical indicia of the large circle) and/or the worst projected state (e.g., by the shading or other graphical indicia of the small circle) among all process variables associated with the corresponding component of the process control system. In some examples, the top banner 1818 includes a navigation button 1824 that enables an operator to navigate to a dedicated screen (e.g., a graphical representation 53 displayed via viewport 52) associated with the particular component of the process control system. In the illustrated example, the top banner 1818 of the summary pane 1800 also includes a collapse/expand button 1826 to collapse the process variable summary pane 1800 to just the top banner 1818 as shown in FIG. 18D, or to expand the process variable summary pane 1800 of FIG. 18D to anyone of the expanded views shown in FIGS. 18A-18B.

Additionally, the detailed view 300 of FIG. 18 may include an event history button (not shown) to provide operators with more temporal context for the events (e.g., alarms) and further augment the trend-based monitoring and analysis of the condition of the process control system. In some implementations, an operator may select the event history button to open an event summary table 3300, an example of which is illustrated in FIG. 18E, that provides additional information about alarms and/or other events monitored in the process control system. In some examples, the event history table 3300 may displayed within the detailed view 300 of FIG. 18. In other examples, the event history table 3300 may be generated in a pop-up window and/or other display area.

As shown in FIG. 18E, the information provided in the event history table 3300 is based on key changes, alarms, and/or events within the process control system that are tagged over time to provide situational awareness and recovery for operators to better diagnose potential problems and understand how they relate to other aspects of the process control system. For example, the event history table 3300 includes the date and time (e.g., hours and minutes) of each event, a description of the event, the unit and/or parameter associated with the event, and action items to be performed and/or already completed that are associated with the event. In addition to the above information, the event history table 3300 also includes a column corresponding to the status and/or impact of the event. As shown in the illustrated example, the status and/or impact column of the event history table 3300 incorporates trend-based graphics 3302 corresponding to the graphics used throughout the operator interface as described above. In this manner, operators may quickly identify the timing and relationships of the process variables associated with the graphics 3302 that are displayed throughout the operator interface.

Figure 19:
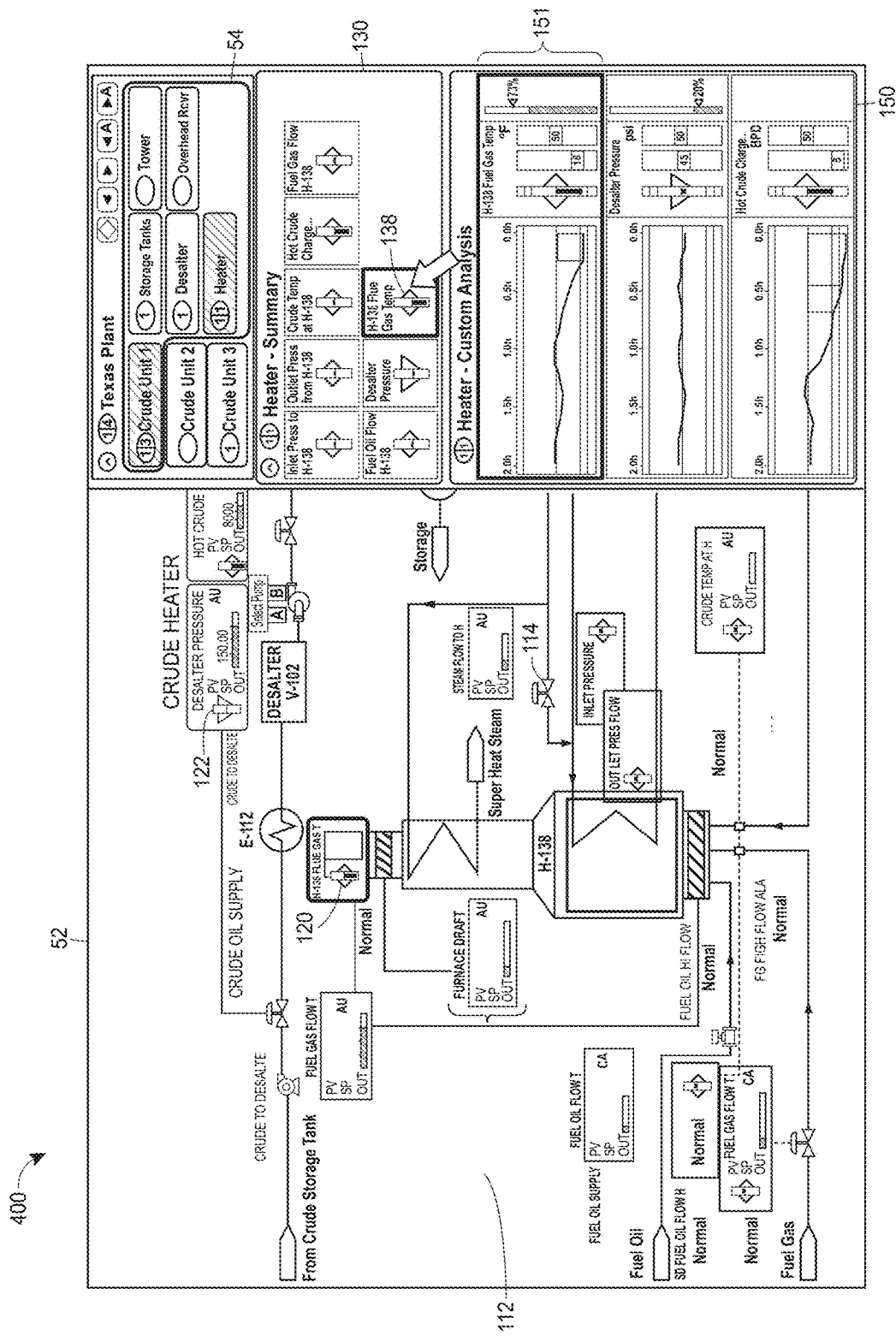
FIG. 19 is a screen shot of a highlighted selected process variable and a number of corresponding highlighted detailed views of the selected process variable.

Referring now to FIG. 19, an exemplary screen shot 400 includes the graphical representation of a heater 112 displayed within the viewport 52, the navigation pane 54, the summary pane 130, and the expanded pane 150. The graphic display application 30 may allow the operator to visually identify, within the P&ID and other panes, the process variable that is associated with a hover event or confirmation selection of the operator. For instance, in response to detecting an operator-initiated hover event near or over the graphic trend symbol 138 for the process variable labeled "Flue Gas Temp" within the summary pane 130, the graphic display application 30 may highlight the corresponding graphic trend symbol 120 within the graphical representation of the heater 112 within the viewport 52 and highlight the expanded view of the corresponding graphic trend symbol 151 for the same process variable.

Figure 20A:
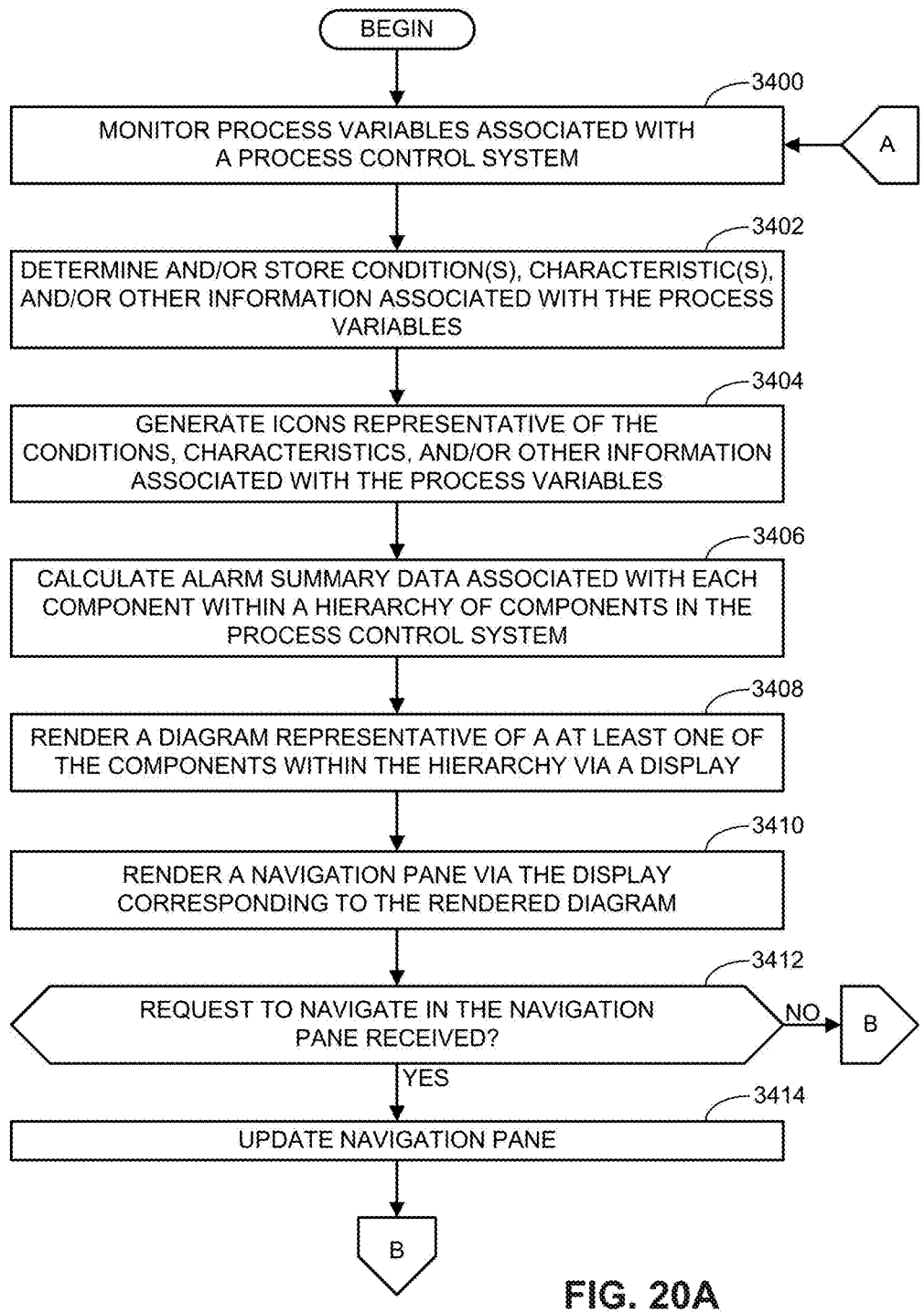
FIG. 20A-20B is an example method of generating a graphic trend symbol.
Figure 20B:
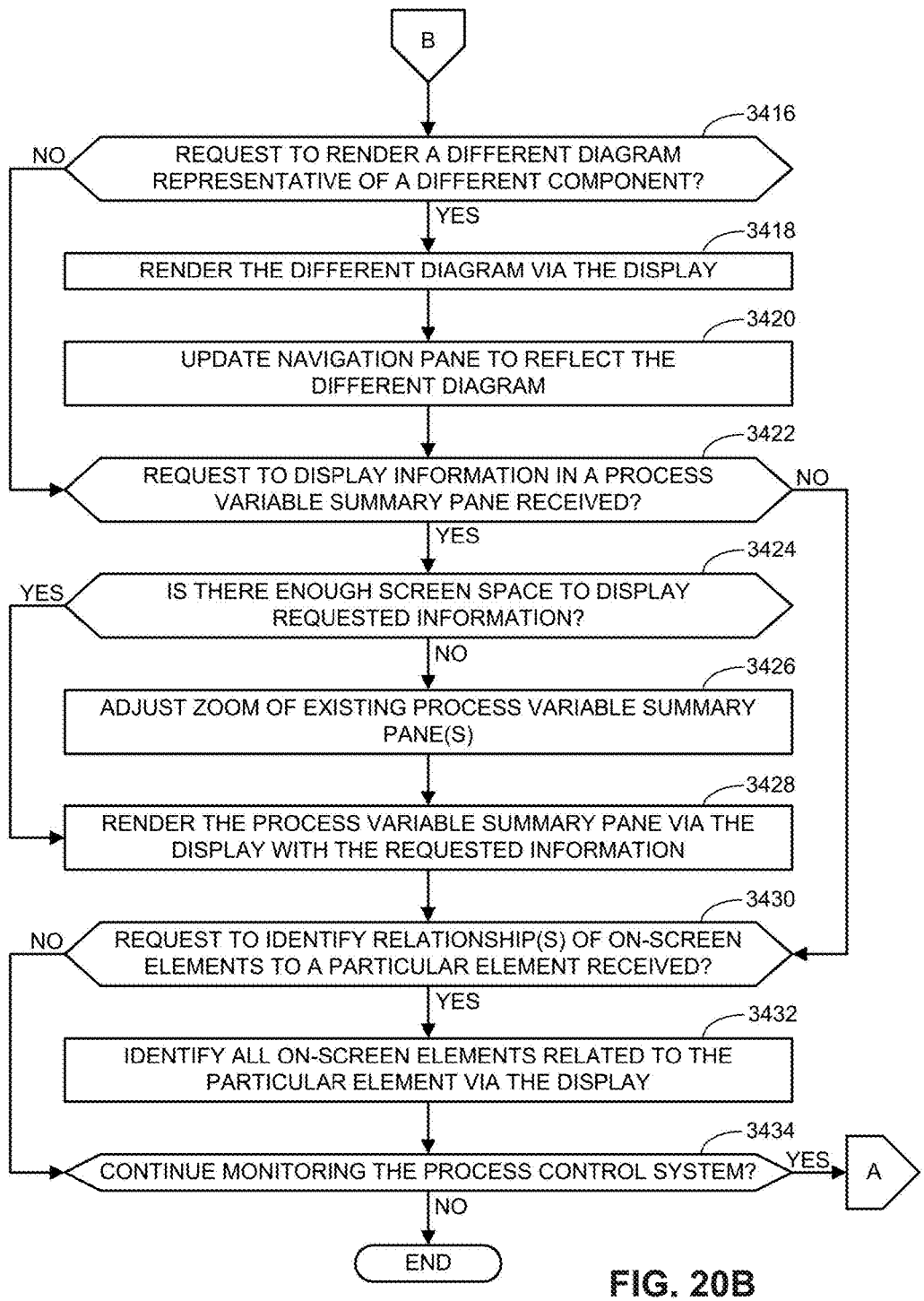

A flowchart representative of an example method for implementing the example operator station 104 of FIG. 2 is shown in FIGS. 20A-20B. In this example, the method may be implemented using machine readable instructions that comprise a program for execution by a processor. The program may be embodied in software stored on a tangible computer readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in firmware or dedicated hardware. Further, although the example program is described with reference to the flowchart illustrated in FIGS. 20A-20B, many other methods of implementing the example graphic display application 30 may alternatively be used. For example, the order of execution of the blocks may be changed, and/or some of the blocks described may be changed, eliminated, or combined.

The method illustrated in FIGS. 20A-20B begins at block 3400 by the graphic display application 30 monitoring process variables associated with a process control system (e.g., the example process control system 10 of FIG. 1). At block 3402, graphic display application 30 determines and/or stores condition(s), characteristic(s), and/or other information associated with the process variables. The condition(s), characteristic(s), and/or other information may include any of a current state of a process variable, a projected state of the process variable, a corresponding trend of the process variable, a direction of change of the process variable, a rate of change of the process variable, a relative position of the process variable with respect to a set point (e.g., above, below, or approximately at the set point), a relative deviation of the process variable from the set point with respect to an operational range of values for the process variable, a relative distance of the process variable with respect to an alarm limit, an actual value of the process variable, and/or the historical or archived values of the process variable tagged over time.

At block 3404, the graphic display application 30 generates icons representative of the condition(s), characteristic(s), and/or other information associated with the process variables. For example, the generated icons may correspond to any of the icons described above in connection with FIGS. 6-17. At block 3406, the graphic display application 30 also calculates alarm summary data associated with each component within a hierarchy of components in the process control system. The alarm summary data corresponds to one or more of the presence of an active alarm associated with a process variable corresponding to each of the components, the number of the active alarms associated with each of the components, the current state of each of the corresponding process variables, or a projected state of each of the corresponding process variables. As described above, each component may correspond to any of a plant, site, area, unit, module, etc., and higher level components in the hierarchy may contain multiple lower level components. Thus, the alarm summary data of each higher level component may include the alarm summary data of corresponding lower level components (e.g., subcomponents.)

At block 3408, the graphic display application 30 renders a diagram representative of at least one of the components within the hierarchy via a display. In some examples, the component for display is selected based on a user input (e.g., an operator input). In some examples, the diagram is a piping and instrumentation diagram (P&ID) composed of multiple elements representative of various aspects and/or subcomponents of the selected component for display. Furthermore, the diagram may provide key indicators and/or other relevant information associated with the process variables corresponding to the displayed component of the process control system. In the example method of FIGS. 20A-20B, when the operator interface renders the diagram, the operator interface includes the generated icons (block 3404) adjacent to, or in place of, the key indicators and/or other relevant information. For example, the icons may be displayed next to elements in the P&ID corresponding to the source of the corresponding process variables. Additionally, the icons associated with process variables in an alarm state may also be rendered within an alarm banner.

At block 3410, the operator interface renders a navigation pane via the display corresponding to the rendered diagram. The navigation pane includes navigation buttons representative of components within the hierarchy similar to any of the navigation panes described above in connection with FIGS. 2A-2D. In such examples, each navigation button may be associated with a corresponding alarm summary icon that is representative of the calculated alarm summary data (block 3406).

At block 3414, the graphic display application 30 determines whether a request to navigate within the navigation pane has been received. A request to navigate within the navigation pane may arise from an operator selecting (e.g., via a mouse click) on a navigation button that is not within a direct path of the hierarchy associated with component currently represented by the displayed diagram (e.g., previewing the relationship of other components). If the graphic display application 30 determines that such a request has been received (block 3412), the graphic display application 30 updates the navigation pane. The updated navigation pane may include new navigation buttons corresponding to components at a lower level in the hierarchy below the component associated with the selected navigation button (e.g., child components). Furthermore, an indication of the direct path in the hierarchy to the navigation button associated with the currently displayed diagram may also be provided if the new navigation buttons prevent the entire path from being represented. Once the navigation pane has been updated (block 3414), control advances to block 3416. If the graphic display application 30 determines that a request to navigate within the navigation pane has not been received (block 3412), control immediately advances to block 3416.

At block 3416, the graphic display application 30 determines whether a request to render a different diagram representative of a different component of the process control system has been received. A request to render a different diagram may arise from an operator selecting (e.g., via double-mouse click) a navigation button corresponding to a different component than the component currently represented by the rendered diagram. In other examples, an operator may select (e.g., via double-mouse click) an element within the diagram corresponding to a subcomponent within the currently displayed component. If the graphic display application 30 determines that a request has been received (block 3412), the graphic display application 30 renders the different diagram via the display (block 3418). As described above in connection with block 3408, the graphic display application 30 may display different icons corresponding to the process variables associated with the component represented by the new diagram within the diagram. In addition to rendering the new diagram (block 3418), the operator interface updates the navigation pane to reflect the different diagram rendered (block 3420). For example, the navigation button associated with the component represented by the new diagram may be altered to be visually identifiable from other navigation buttons as described above. After updating the navigation pane (block 3420), control advances to block 3422. Returning to block 3416, if the graphic display application 30 determines that a request to render a different diagram has not been received (block 3412), control immediately advances to block 3422.

At block 3422, the graphic display application 30 determines whether a request to display information in a process variable summary pane has been received. The process variable summary pane may be similar to any of the process variable summary panes described above in connection with FIGS. 18-18E. A request to display information within a process variable summary pane may include an operator requesting a new process variable summary pane to be created or for an existing process variable summary pane to be expanded to display additional information. If it is determined that such a request is received (block 3422), the graphic display application 30 determines whether there is enough space within a designated display area to display the requested information (block 3424). Whether there is enough space depends on size of the designated display area, the amount of information that is requested to be displayed, and what information is already displayed. In some examples, the designated display area corresponds to a screen space on an output display device having a defined size (e.g., a defined width and height of pixels) such as, for example, the detailed view 300 of the screen shot 110 of FIG. 5. In such examples, as more process variables are to be summarized and/or as more information is to be represented (e.g., via basic graphics, mid-level graphics, or detailed graphics), more screen space is needed to display the requested information. In such examples, the total amount of information to be displayed (based on what is already displayed and the additional information requested) may exceed the available area defined by the screen space and the operator station would determine that there is not enough space within the designated area to display the requested information (block 3424).

In other examples, the designated display area is not limited to a particular size but can vary depending upon the information requests of an operator at any particular moment. As such, in some examples, the designated display area may be greater in size than the corresponding display screen through which the designated display area is rendered such that only a portion of the designated display area is available at any given moment (e.g., by scrolling up or down). For example, rather than displaying the requested information in a detailed view 300 on a display screen, in some examples, the requested information is displayed via an interface of a portable handheld device (e.g., a smart phone, tablet, etc.) where the screen size and/or resolution is limited. In some such examples, the requested information, as represented by the icons and related graphics described herein, is displayed in an independent interface that takes up all or substantially all of the screen display area of the corresponding display device (e.g., the icons are shown without displaying a corresponding P&ID) with the ability to scroll between various portions of the designated display area when it cannot all be rendered within a single screen of the display device. In such examples, the operation application may determine that there is enough space within the designated display area to display the requested information (block 3424), because the designated display area is not limited to a defined size.

Continuing in the example process, if the graphic display application 30 determines there is not enough space within the designated display area (block 3424), the graphic display application 30 adjusts the zoom of existing process variable summary pane(s) (block 3426). For example, the graphic display application 30 may reduce the existing process variable summary pane(s) to a lower level of detail and/or collapse the summary pane to only display the top banner. Once the existing process variable summary pane(s) have been adjusted (block 3426), the operator interface renders the process variable summary pane with the requested information via the display (block 3428). If the graphic display application 30 determines that there is enough space within the designated display area (or the display area can dynamically change size) to display the requested information (block 3424), the operator interface directly renders the corresponding process variable summary pane (block 3428). Once the process variable summary pane has been rendered, control advances to block 3430. Returning to block 3422, if the graphic display application 30 determines that a request to display information in a process variable summary pane has not been received, the example method of FIGS. 20A-20B advances to block 3430.

At block 3430, the graphic display application 30 determines whether a request to identify relationship(s) of on-screen elements to a particular element has been received. On-screen elements may correspond to any of graphical elements within the diagram representative of components or subcomponents within the process control system, textual elements within the diagram providing information associated with process variables corresponding to the displayed components, icons displayed within the diagram corresponding to the process variables, information in an alarm banner, and/or graphics within one or more process variable summary panes. A request to identify a relationship between any of the above elements may arise from an operator selecting (e.g., via a mouse click, mouse hover, etc.) one of the displayed elements. If the graphic display application 30 determines that such a request has been received (block 3430), the operator interface identifies the on-screen elements associated with particular element selected via the display (block 3432). That is, the components represented within the diagram may be identified along with the corresponding navigation button in the navigation pane as described above in connection with FIG. 2. Additionally or alternatively, an alarm banner entry, an icon and/or textual information in the diagram, and/or one or more graphics in one or more process variable summary panes associated with the same process variable may be identified as described above in connection with FIG. 3.

Once related elements are identified (block 3432), control advances to block 3434. If the graphic display application 30 determines that a request to identify relationship(s) of elements has not been received, control advances directly to block 3434. At block 3434, the graphic display application 30 determines whether to continue monitoring the process control system. If the process control system is to be monitored, control returns to block 3400 of the example process. If the graphic display application 30 determines not to continue monitoring the process control system, the example process of FIGS. 20A-20B ends.

The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

What is claimed:

1. A method in a computing device for providing displaying a navigation pane and a graphical depiction of a process control plant in a screen of the computing device for navigating to different areas of the graphical depiction of the process control plant, the method comprising:

displaying, within a fixed and bounded area in the screen, the navigation pane that includes a unit selection area and an equipment selection area, wherein (i) the unit selection area includes one or more unit selector icons that correspond to one or more units in the graphical depiction of the process control plant and correspond to one or more units in the process control plant, (ii) the equipment selection area includes one or more equipment selector icons that correspond to one or more equipment in the graphical depiction of the process control plant and correspond to one or more actual equipment items in the process control plant, (iii) each unit in the process control plant includes one or more actual equipment in the process control plant, and (iv) each unit selector icon of the unit selection area is associated with one or more equipment items selector icons of the equipment selection area based on the included one or more actual equipment in the process control plant associated with the unit that corresponds to the unit selector icon;

wherein the one or more unit selector icons include an aggregate alarm identifier within each of the one or more unit selector icons, each aggregate alarm identifier comprises two alarm indicators that are associated with the corresponding unit selector icon, each of the alarm indicators displays alarm information that is aggregated from alarms from different equipment in the graphical depiction of the process control plant associated with the corresponding unit selector icon, the alarm indicators indicating a number of alarms at each priority level;

displaying, in response to receiving a selection of a first unit selector icon in the unit selection area;

one or more equipment selector icons in the equipment area associated with a first unit in the process control plant that corresponds to the selected first unit selector icon, wherein (i) the one or more equipment selector icons associated with the selected first unit selector icon are displayed in the equipment selection area and (ii) the one or more non-selected unit selector icons remain displayed in the unit selection area;

highlighting, in response to detecting a hover event associated with the first unit selector icon in the unit selection area of the navigation pane, the first corresponding unit in the graphical depiction of the process control plant; and displaying, in response to receiving the selection of the first unit selector icon in the unit selection area of the navigation pane, a subsection of the graphical depiction of the process control plant associated with the first unit in the process control plant corresponding to the selected first unit selector icon in the graphical depiction of the process control plant.

2. The method of claim 1, further comprising:
displaying, in response to receiving a selection of a second unit selector icon in the unit selection area, one or more equipment selector icons corresponding to equipment in the graphical depiction of the process control plant that is associated with a second unit in the process control plant corresponding to the selected second unit selector icon, wherein the one or more equipment selector icons associated with the selected second unit selector icon are displayed in the equipment selection area and wherein the one or more non-selected unit selector icons remain displayed in the unit selection area.

3. The method of claim 1, wherein receiving the selection of the first unit selector icon in the unit selection area includes receiving the selection via a command from a user interface.

4. The method of claim 1, further comprising:
highlighting, in response to receiving the selection of a first equipment selector icon in the equipment selection area, the first corresponding equipment in the graphical depiction of the process control plant, wherein receiving the selection of the first equipment selector icon includes detecting a hover event associated with the first equipment selector icon via a user interface.

5. The method of claim 1, wherein receiving the selection of a first equipment selector icon in the equipment selection area includes receiving the selection via a command from a user interface.

6. The method of claim 5, further comprising:
displaying, in response to receiving the selection of the first equipment selector icon in the equipment selection area, a subsection of the graphical depiction of the process control plant associated with the first corresponding equipment of the first unit in the process control plant corresponding to the selected first equipment selector icon in the graphical depiction of the process control plant.

7. The method of claim 1, wherein displaying the one or more equipment selector icons includes displaying an alarm identifier within each of the one or more equipment selector icons, each aggregate alarm identifier comprising two alarm indicators that are associated with the corresponding equipment selector icon, each of the alarm indicators displaying alarm information that is aggregated from alarms associated with the corresponding equipment in the graphical depiction of the process control plant associated with the corresponding equipment selector icon, the alarm indicators indicating a number of alarms at each priority level.

8. The method of claim 7, wherein displaying alarm information includes displaying one or more types of alarms associated with the corresponding equipment in the graphical depiction of the process control plant.

9. A non-transitory computer-readable storage medium having stored thereon a set of instructions, executable by a processor, for displaying, via a computing device having a user interface, a navigation pane and a graphical depiction of a process control plant in a screen of the computing device for navigating to different areas of the graphical depiction of the process control plant, the instructions comprising:

instructions for displaying, within a fixed and bounded area in the screen, the navigation pane that includes a unit selection area and an equipment selection area, wherein (i) the unit selection area includes one or more unit selector icons that correspond to one or more units in the graphical depiction of the process control plant and correspond to one or more units in the process control plant, (ii) the equipment selection area includes one or more equipment selector icons that correspond to one or more equipment in the graphical depiction of the process control plant and correspond to one or more actual equipment items in the process control plant, (iii) each unit in the process control plant includes one or more actual equipment in the process control plant, and (iv) each unit selector icon of the unit selection area is associated with one or more equipment items selector icons of the equipment selection area based on the included one or more actual equipment in the process control plant associated with the unit that corresponds to the unit selector icon;

wherein the one or more unit selector icons include an aggregate alarm identifier within each of the one or more unit selector icons, each aggregate alarm identifier comprises two alarm indicators that are associated with the corresponding one or more unit selector icon, each of the alarm indicators displays alarm information that is aggregated from alarms from different equipment in the graphical depiction of the process control plant associated with the corresponding unit selector icon, the alarm indicators indicating a number of alarms at each priority level;

instructions for displaying, in response to receiving a selection of a first unit selector icon in the unit selection area:

one or more equipment selector icons in the equipment area associated with a first unit in the process control plant that corresponds to the selected first unit selector icon, wherein (i) the one or more equipment selector icons associated with the selected first unit selector icon are displayed in the equipment selection area and (ii) the one or more non-selected unit selector icons remain displayed in the unit selection area;

instructions for highlighting, in response to detecting a hover event associated with the first unit selector icon in the unit selection area of the navigation pane, the first corresponding unit in the graphical depiction of the process control plant and instructions for displaying, in response to receiving the selection of the first unit selector icon in the unit selection area of the navigation pane, a subsection of the graphical depiction of the process control plant associated with the first unit in the process control plant corresponding to the selected first unit selector icon in the graphical depiction of the process control plant.

10. The non-transitory computer-readable storage medium of claim 9, further comprising:

instructions for displaying, in response to receiving a selection of a second unit selector icon in the unit selection area, one or more equipment selector icons corresponding to equipment in the graphical depiction of the process control plant that is associated with a second unit in the process control plant corresponding to the selected second unit selector icon, wherein the one or more equipment selector icons associated with the selected second unit selector icon are displayed in the equipment selection area and wherein the one or more non-selected unit selector icons remain displayed in the unit selection area.

11. The non-transitory computer-readable storage medium of claim 9, wherein the instructions for receiving the selection of the first unit selector icon in the unit selection area include instructions for receiving the selection via a command from a user interface.

12. The non-transitory computer-readable storage medium of claim 9, further comprising:

instructions for highlighting, in response to receiving the selection of a first equipment selector icon in the equipment selection area, the first corresponding equipment in the graphical depiction of the process control plant, wherein receiving the selection of the first equipment selector icon includes detecting a hover event associated with the first equipment selector icon via a user interface.

13. The non-transitory computer-readable storage medium of claim 9, wherein the instructions for receiving the selection of a first equipment selector icon in the equipment selection area include instructions for receiving the selection via a command from a user interface.

14. The non-transitory computer-readable storage medium of claim 13, further comprising:

instructions for displaying, in response to receiving the selection of the first equipment selector icon in the equipment selection area, a subsection of the graphical depiction of the process control plant associated with the first corresponding equipment of the first unit in the process control plant corresponding to the selected first equipment selector icon in the graphical depiction of the process control plant.

15. The non-transitory computer-readable storage medium of claim 9, wherein the instructions for displaying the one or more equipment selector icons includes instructions for displaying an alarm identifier within each of the one or more equipment selector icons, each aggregate alarm identifier comprising two alarm indicators that are associated with the corresponding equipment selector icon, each of the alarm indicators displaying alarm information that is aggregated from alarms associated with the corresponding equipment in the graphical depiction of the process control plant associated with the corresponding equipment selector icon, the alarm indicators indicating a number of alarms at each priority level.

16. The non-transitory computer-readable storage medium of claim 15, wherein the instructions for displaying alarm information includes instructions for displaying one or more types of alarms associated with the corresponding equipment in the graphical depiction of the process control plant.

* * * * *